United States Patent
Shimizu

(10) Patent No.: US 8,422,396 B2
(45) Date of Patent: Apr. 16, 2013

(54) RATE MONITORING APPARATUS

(75) Inventor: Makoto Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 733 days.

(21) Appl. No.: 12/561,512

(22) Filed: Sep. 17, 2009

(65) Prior Publication Data
US 2010/0091683 A1 Apr. 15, 2010

(30) Foreign Application Priority Data
Oct. 14, 2008 (JP) .................. 2008-265362

(51) Int. Cl.
*H04L 12/26* (2006.01)

(52) U.S. Cl.
USPC .......................................... 370/253

(58) Field of Classification Search ............... 370/230.1, 370/412, 253
See application file for complete search history.

(56) References Cited

U.S. PATENT DOCUMENTS

| 7,027,394 B2 * | 4/2006 | Gupta et al. ............... 370/230.1 |
| 2006/0098675 A1 * | 5/2006 | Okuno ......................... 370/412 |

FOREIGN PATENT DOCUMENTS

JP 2001-308881 11/2001

* cited by examiner

*Primary Examiner* — Mark Rinehart
*Assistant Examiner* — Gbemileke Onamuti
(74) *Attorney, Agent, or Firm* — Staas & Halsey LLP

(57) ABSTRACT

A rate monitoring apparatus using a token bucket algorithm for controlling a packet flow, the apparatus includes a packet information storage unit having two storage media for storing packet information extracted from a packet data, a token identifying information storage unit having two storage media for storing identification information used for supplying a created token, and an operation unit for performing a policing operation by using a packet length, an allowable burst size, a token supply capacity and a currently transmittable data capacity, based on an identifying information included in the packet information and a comparison result between identification information included in the packet information and the identification information used for supplying the created token, these compared identification information being read out from the other storage medium different from the storage medium under writing in the packet information storage unit and the token identifying information storage unit.

5 Claims, 25 Drawing Sheets

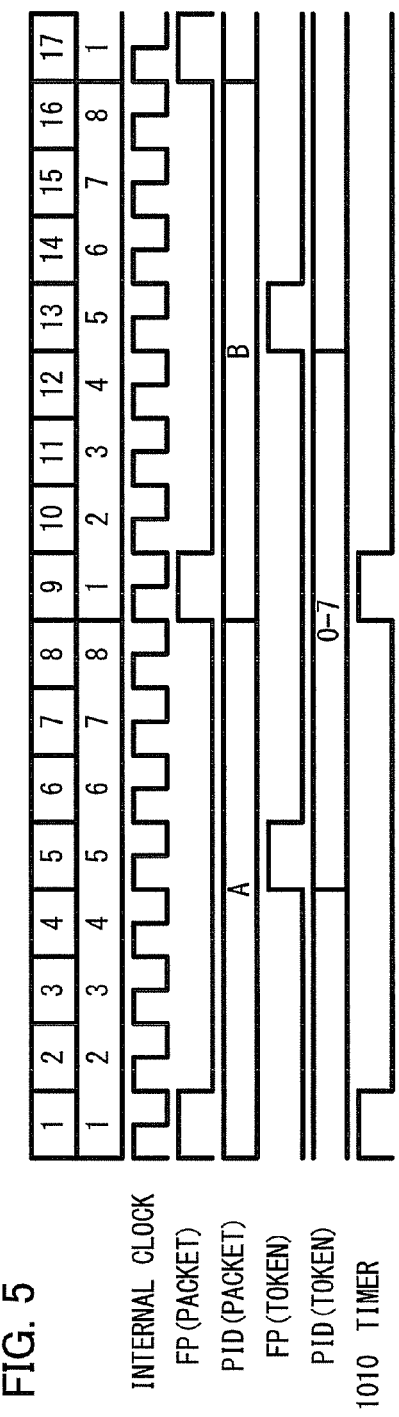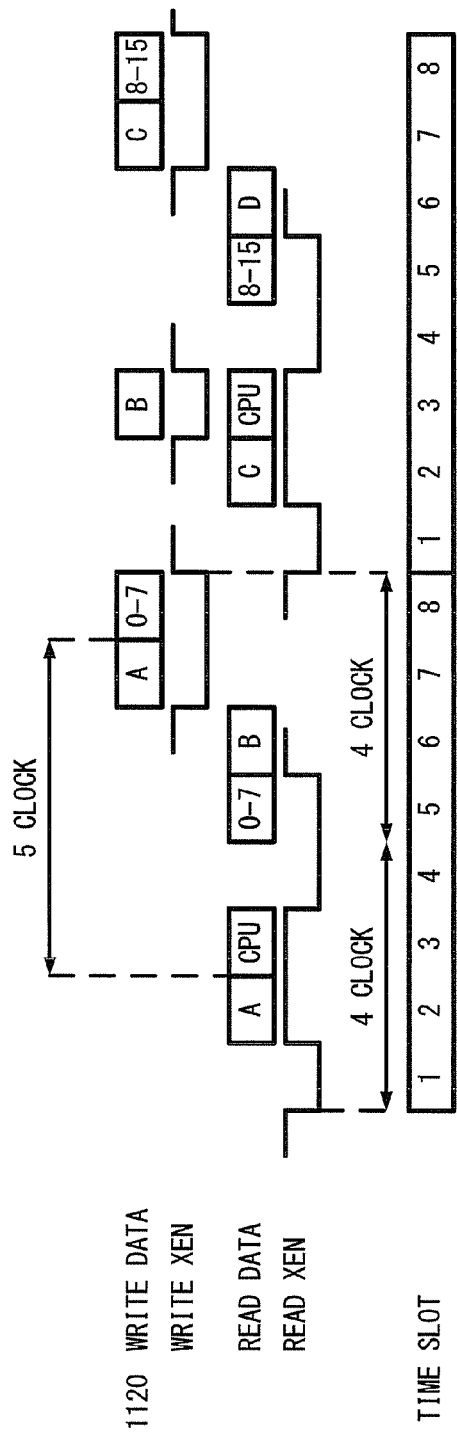
FIG. 5

FIG. 17

| PID | ON/OFF | BURST SETTING | TOKEN SETTING |
|---|---|---|---|
| 0 | ON | BST0 | TOKEN0 |
| 1 | OFF | BST1 | TOKEN1 |
| ... | ... | ... | ... |
| 1022 | ON | BST1022 | TOKEN1022 |
| 1023 | ON | BST1023 | TOKEN1023 |

FIG. 18

| PID | ON/OFF | TOKEN COUNTER |
|---|---|---|
| 0 | ON | CTR0 |
| 1 | OFF | CTR1 |
| ... | ... | ... |
| 1022 | ON | CTR1022 |
| 1023 | ON | CTR1023 |

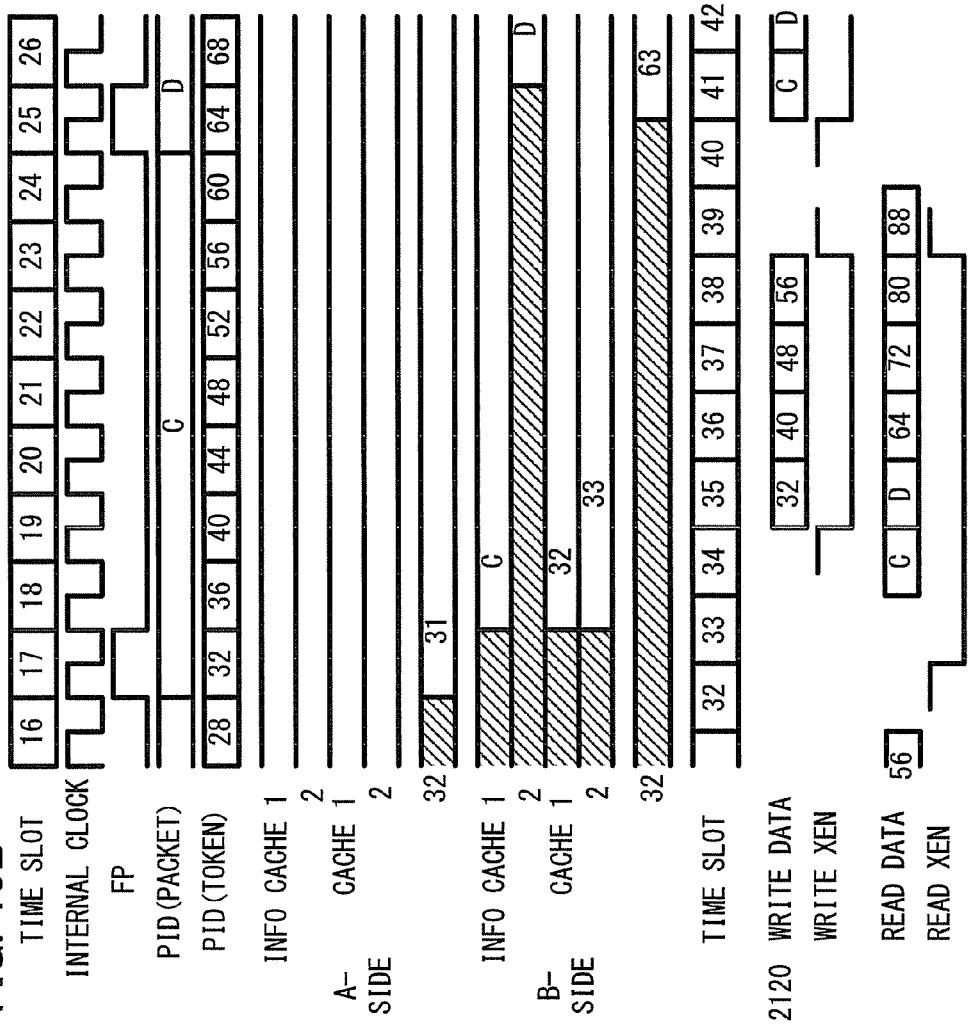

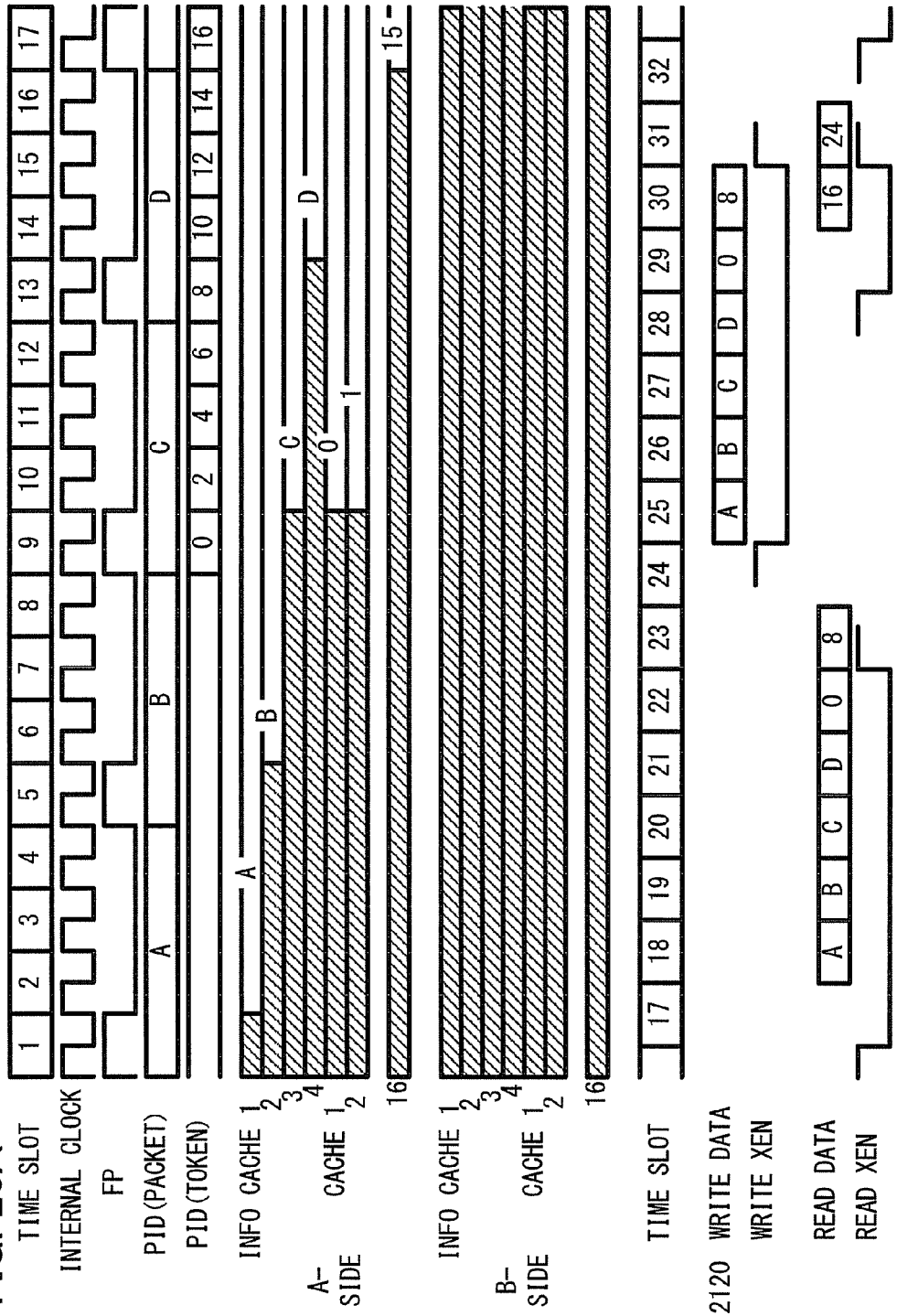

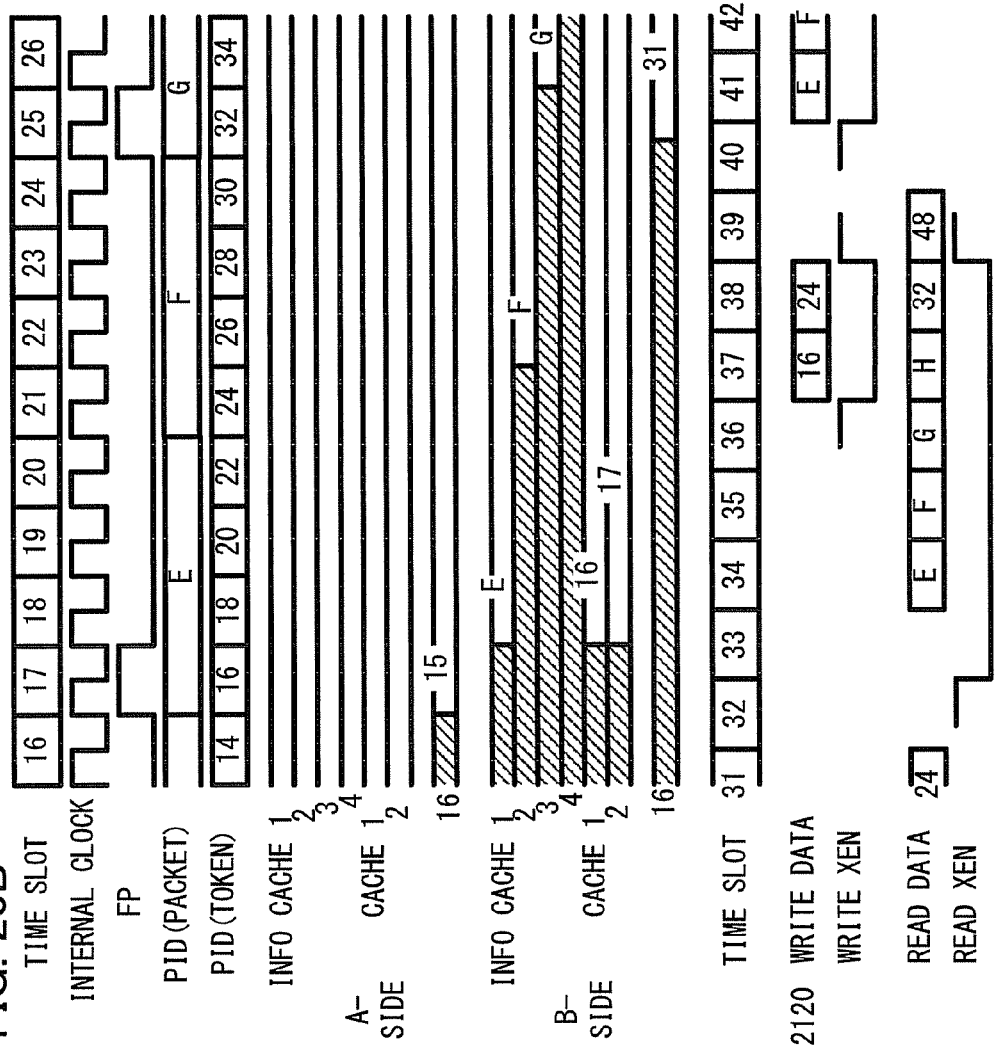

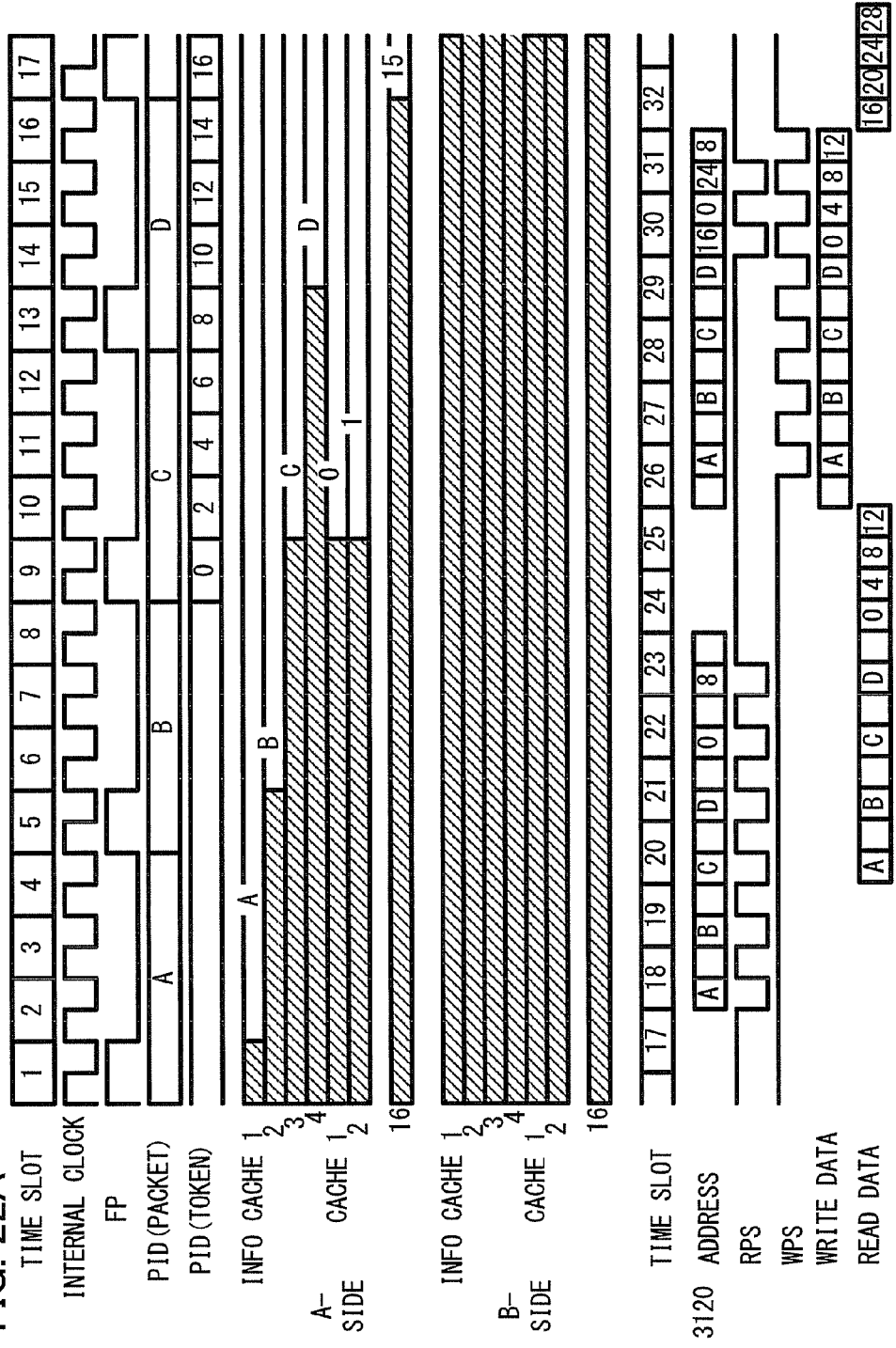

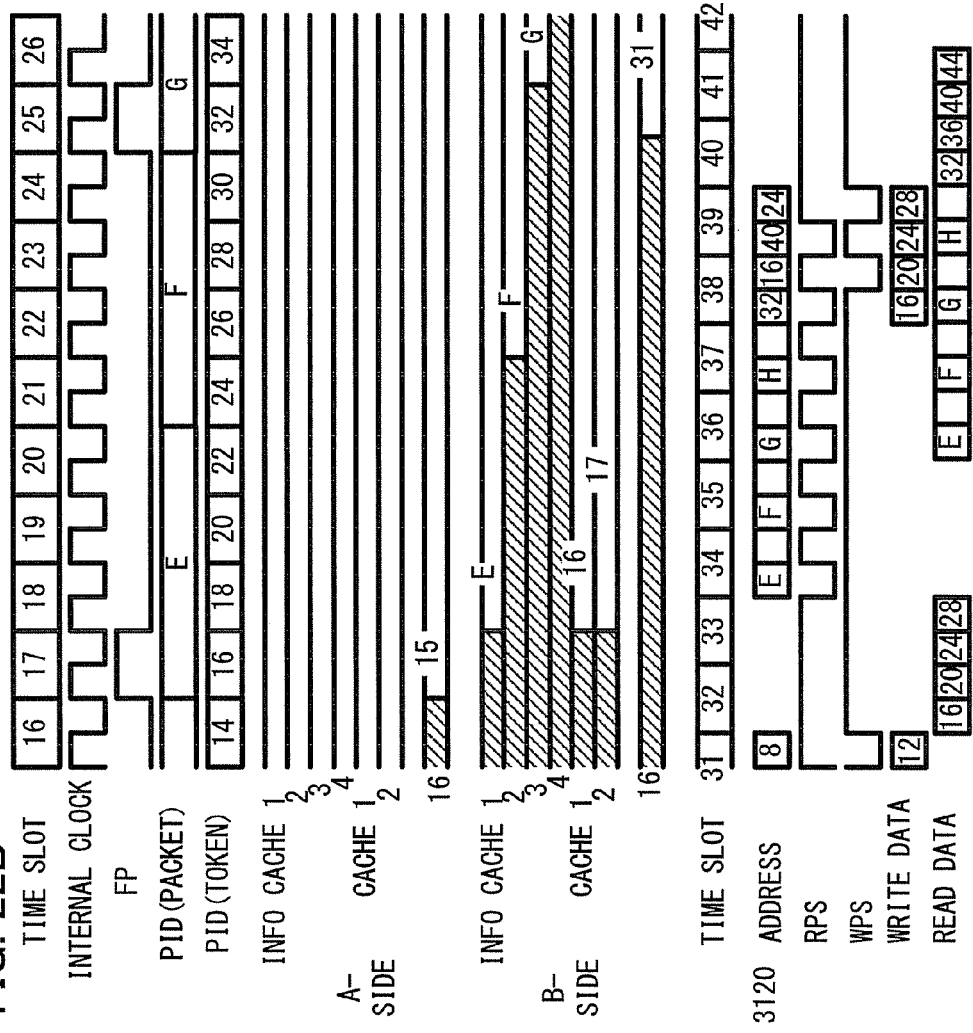

RATE MONITORING APPARATUS

CROSS-REFERENCE TO RELATED APPLICATIONS

This application is based upon and claims the benefit of priority of the prior Japanese Patent Application No. 2008-265362, filed on Oct. 14, 2008, the entire contents of which are incorporated herein by reference.

FIELD

The embodiment discussed herein is related to a rate monitoring apparatus using a token bucket algorithm.

BACKGROUND

In conventional packet forwarding apparatuses, the input rate and the output rate are monitored. In the future, it is predicted that there will be a demand for increased data capacity and for detailed rate monitoring. Accordingly, there is a demand for an architecture which meets such a demand.

The data collection capacity of an interface unit for a device which performs data forwarding etc., has been increasing year by year.

Until a few years ago, Fast Ether (FE, bit rate: 100 Mbps) and Giga Bit Ether (GbE, bit rate: 1 Gbps) were the mainstream. However, in recent years, network data capacity has been increasing. Furthermore, 10 GbE (10 Giga Bit Ether, bit rate: 10 Gbps) interfaces have increased, typical examples of which include backbone networks.

An interface unit provides a Quality of Service (QoS) function. This function provides policing (rate monitoring) operations for forwarding data or discarding data, etc., in increments of users.

Until a few years ago, interface units that bundled FE or GbE were the mainstream, and the data collection rate of the unit was around 10 GbE. In recent years, increased data capacity has required a unit that bundles 10 GbE data, and has further required a unit that bundles 20 GbE. At the same time, there is a demand for detailed data monitoring of the data thus collected.

Ordinary policing methods provide such rate monitoring by performing operation processing and memory access in increments of packets as disclosed in Japanese Laid-open Patent Publication No. 2001-308881. However, there are limits to such operation processing speed and memory access, leading to a problem in that such a method does not meet the demand for increased data capacity and detailed rate monitoring.

SUMMARY

According to an aspect of an embodiment, a rate monitoring apparatus using a token bucket algorithm for controlling a packet flow over a network, the rate monitoring apparatus includes a packet information storage unit having two storage media for storing packet information extracted from a packet data, a token identifying information storage unit having two storage media for storing identification information used for supplying a created token, and an operation unit for performing one of a policing operation and a shaping operation by using a packet length, an allowable burst size, a token supply capacity and a currently transmittable data capacity, based on an identifying information included in the packet information and a comparison result between identification information included in the packet information and the identification information used for supplying the created token, these compared identification information being read out from the other storage medium different from the storage medium under writing in the packet information storage unit and the token identifying information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating another example of a time chart according to the configuration of standard embodiment;

FIG. 17 is a diagram illustrating an example of the configuration of a token supply setting unit;

FIG. 18 is a diagram illustrating an example of the configuration of a token counter unit;

FIGS. 19A and 19B are diagrams illustrating an example of a time chart according to the first embodiment;

FIGS. 20A and 20B are diagrams illustrating another example of a time chart according to the first embodiment;

FIGS. 22A and 22B are diagrams illustrating an example of a time chart according to the second embodiment.

DESCRIPTION OF EMBODIMENTS

With reference to drawings, embodiments will be described in detail below. The configuration of the embodiments will be described for exemplary purposes only, and the present invention is not restricted to the configuration of the disclosed embodiment.

[Configuration of Standard Embodiment]

Figure 1:
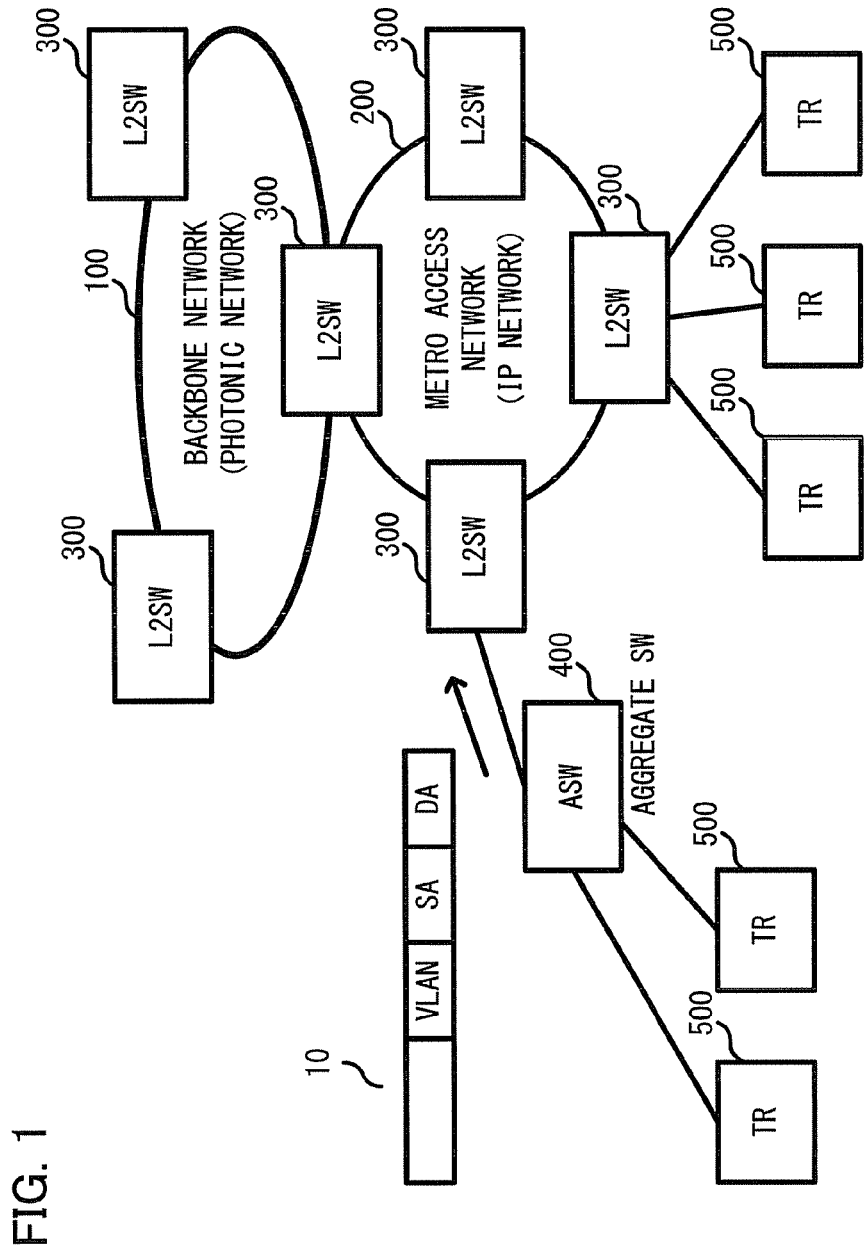
FIG. 1 is a diagram illustrating an example of a network configuration.

FIG. 1 is a diagram illustrating an example of a network configuration.

A network illustrated in FIG. 1 includes a backbone network 100, a metro access network 200; L2SWs (Layer 2 Switch) 300, an ASW (Aggregate Switch) 400, and terminals (TR) 500. The L2SW 300 allows the backbone network 100 and the metro access network 200 to be connected to each other. The L2SW 300 allows the metro access network 200 and the terminals (TR) 500 to be connected to each other. The L2SW 300 allows the metro access network 200 and the ASW (Aggregate Switch) 400 to be connected to each other. The ASW 400 allows the L2SW 300 and the terminals (TR) 500 to be connected to each other. The terminal (TR) 500 communicates with the metro access network 200, the backbone network 100, and so forth, via the L2SW 300 etc.

The L2SW 300 is capable of performing transfer processing, rate monitoring, etc. for each ether frame 10. The ether frame 10 includes a destination address (DA), a source address (SA), and a Virtual Local Area Network (VLAN) tag.

Figure 2:
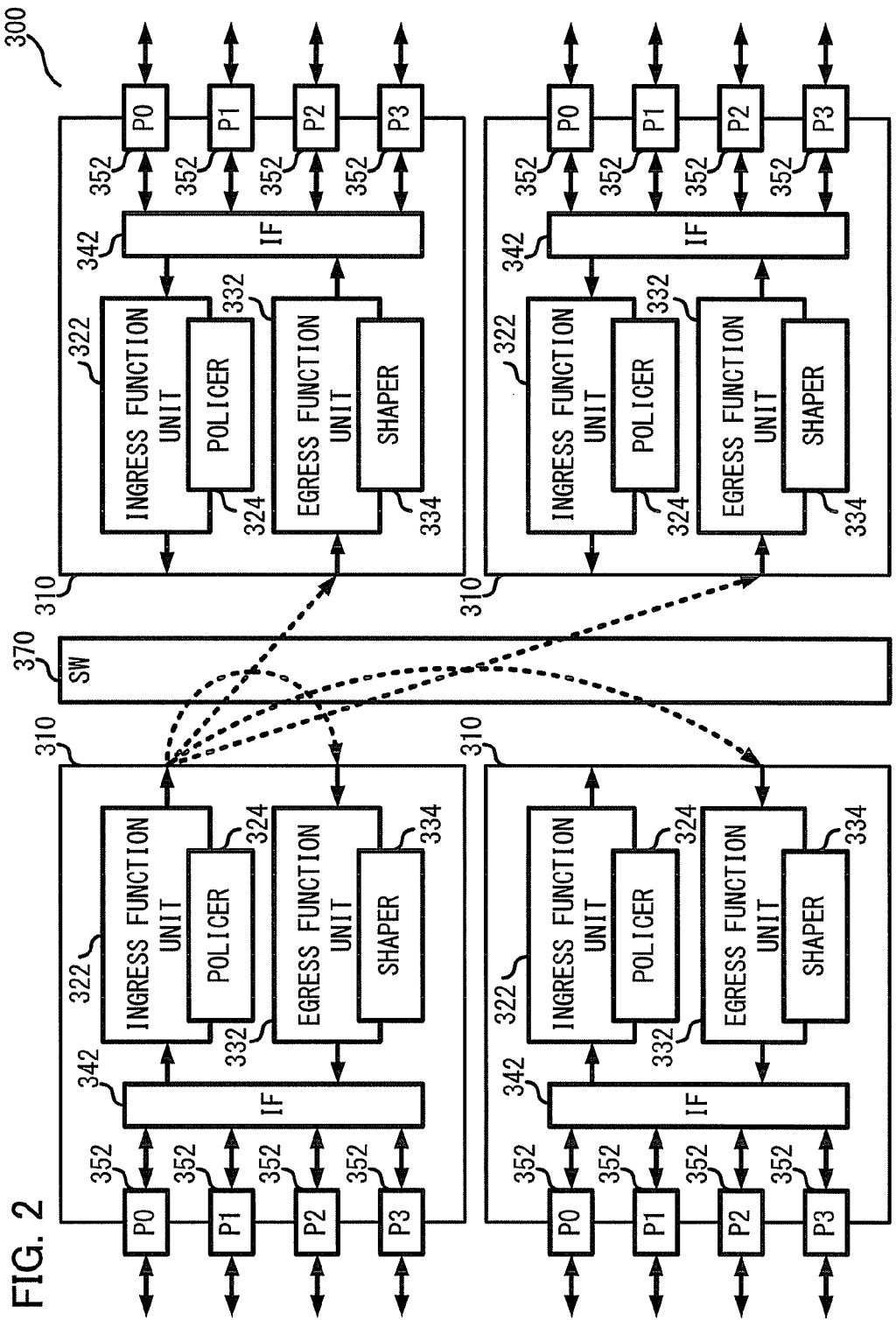
FIG. 2 is a diagram illustrating an example of the overall configuration of an L2SW device.

FIG. 2 is a diagram illustrating an example of the overall configuration of the L2SW.

The L2SW (Layer 2 Switch) 300 illustrated in FIG. 2 includes four LIU (Line Interface Unit) cards (LIU cards #0 through #4) 310, and an SW (switch) 370. Each LIU card 310 includes an ingress function unit 322, an egress function unit 332, an interface unit (IF) 342, and four ports (P0 through P3) 352. The ingress function unit 322 performs processing for an input signal. The ingress function unit 322 has an input rate monitoring function unit (policer) 324. The egress function unit 322 performs processing for an output signal. The egress function unit 332 has an output rate monitoring function unit (shaper) 334. The number of LIU cards 310 and ports 352 is not restricted to the example described above. The number of LIU cards 310 and ports 352 included in the L2SW 300 can be determined as desired according to the installation mode.

The input rate monitoring function unit (policer) 324 and the output rate monitoring function unit (shaper) 334 may be provided in the form of separate devices, i.e., an input rate monitoring function (policing) device and an output rate monitoring function (shaping) device, respectively.

The L2 frames input or output via the ports 352 of the LIU cards 310 are frame multiplexed. For the ingress direction, the policer 324 of the ingress function unit performs input rate monitoring (policer) processing. For the egress direction, the shaper 334 of the egress function unit 332 performs output rate monitoring (shaper) processing.

Description will be made below regarding the input rate monitoring function unit (policer) 324 included in the ingress function unit 322. Also, the embodiments may be applied to the output rate monitoring function unit (shaper) 334 included in the egress function unit 332 in the same way.

[Input Rate Monitoring Function Unit]

Figure 3:
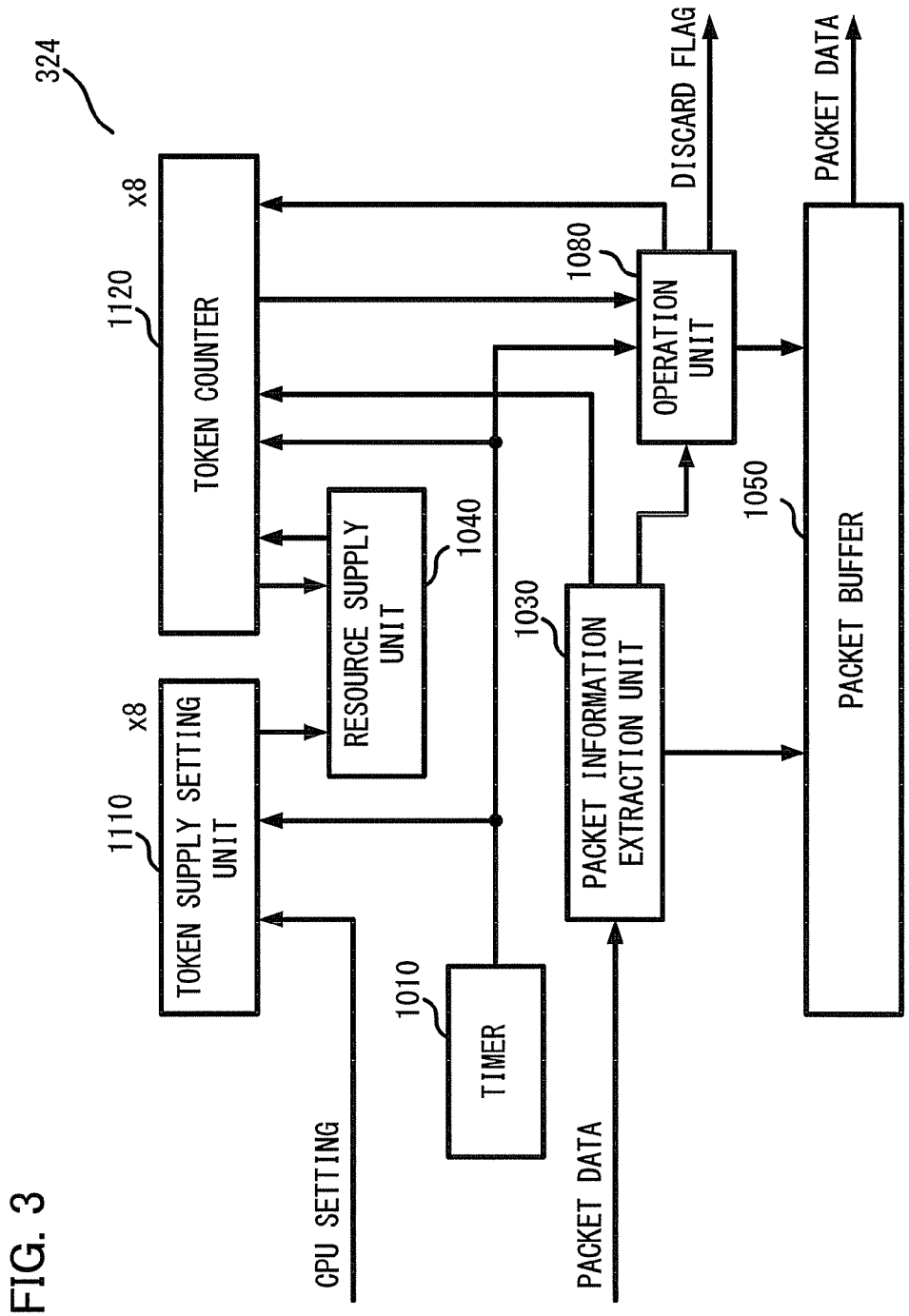
FIG. 3 is a diagram illustrating an example of the configuration of an input rate monitoring function unit.

FIG. 3 is a diagram illustrating the configuration of the input rate monitoring function unit (policer) 324. The input rate monitoring unit (policer) 324 may be provided as an input rate monitoring function (policing) device.

The input rate monitoring function unit (policer) 324 includes a timer 1010, a packet information extraction unit 1030, a resource supply unit 1040, a packet buffer 1050, an operation unit 1080, a token supply setting unit 1110, and a token counter 1120.

Among these units (components), multiple desired devices may be provided in the form of a single unit. Also, among these units, a single desired unit may perform processing as multiple units. Each unit may be realized as hardware or realized as software. The same can be said of the components described later.

The timer 1010 generates token supply timing information and packet operation timing information.

The packet information extraction unit 1030 extracts the packet information from the packet data. The packet information extraction unit 1030 transmits the packet data to the packet buffer 1050. The packet information extraction unit 1030 transmits the packet information to the operation unit 1080. The packet information includes the PID (policer ID) and the packet length. The PID identifies users of policer for a band managing.

The resource supply unit 1040 receives the allowable burst size and the token supply capacity from the token supply setting unit 1110. The resource supply unit 1040 receives the currently transmittable data capacity from the token counter 1120. The resource supply unit 1040 performs token operation processing (addition processing) based upon the data received from the token supply setting unit 1110 and the token counter 1120, and updates the currently transmittable data capacity in the token counter 1120.

The packet buffer 1050 holds the packet data for a period up to a point in time at which the policing processing is performed after the packet data has been received from the packet information extraction unit 1030. The policing processing is performed for determining whether or not the packet is to be discarded.

The operation unit 1080 receives the packet information from the packet information extraction unit 1030. The operation unit 1080 reads out, from the token counter 1120, the currently transmittable data capacity that corresponds to the PID of the packet information thus received. The operation unit 1080 performs packet operation processing (policing processing).

The token supply setting unit 1110 stores the allowable buffer size and the token supply capacity in increments of PIDs. In an example illustrated in FIG. 3, the input rate monitoring function unit (policer) 324 has eight token supply setting units 1110, which enables eight PIDs to be processed at the same time. The token supply setting unit 1110 can be realized as internal RAM (Random Access Memory).

The token counter 1120 manages the currently transmittable data capacity in increments of PIDs. In the example illustrated in FIG. 3, the input rate monitoring function unit (policer) 324 has eight token counters 1120, which enables eight PIDs to be processed at the same time. The token counter 1120 can be realized as internal RAM (Random Access Memory).

[Operation]

As a method for measuring traffic (data flow) in a network, a method which is referred to as the "token bucket method" is known. A token is a quantity of data periodically supplied to a bucket.

[Packet Data Processing]

Upon receiving the packet data (main signal data), the packet information extraction unit 1030 extracts the packet information from the packet data. The packet information includes the PID and the packet length. The packet information extraction unit 1030 transmits the packet information thus extracted to the operation unit 1080 which performs the policing processing. Furthermore, the packet information extraction unit 1030 instructs the packet buffer 1050 to store the packet data thus received. The operation unit 1080 reads out, from the packet buffer 1050, the packet data that the policing processing (policing operation processing) is performed, and transmits the packet data thus read out to the downstream components.

[Token Operation Processing]

The token supply setting unit 1110 writes and holds the data capacity (token supply capacity) which can be transmitted in a predetermined period (token period), the allowable burst size, and the valid/invalid PID setting, in increments of PIDs, according to a CPU setting from an external circuit.

The timer 1010 generates token supply timing information which indicates a timing at which the token supply setting unit 1110 and the token counter 1120 transmit data to the resource supply unit 1040. The timer 1010 transmits the token supply timing information to the token supply setting unit 1110 and the token counter 1120.

The token supply setting unit 1110 transmits the allowable burst size and the token supply capacity to the resource supply unit 1040 according to the token supply timing information. The token counter 1120 transmits the currently transmittable data capacity to the resource supply unit 1040 according to the token supply timing information.

The resource supply unit 1040 obtains the updated currently transmittable data capacity by adding the token supply capacity to the currently transmittable data capacity. In a case in which the updated currently transmittable data capacity thus obtained exceeds the allowable burst size, the resource supply unit 1040 employs the allowable burst size as the updated currently transmittable data capacity. The resource supply unit 1040 writes the updated currently transmittable data capacity to the token counter 1120.

[Packet Operation Processing]

The operation unit 1080 receives the packet information from the packet information extraction unit 1030. The timer 1010 transmits, to the operation unit 1080, the packet operation timing information which indicates a timing at which the packet operation is to be performed. The operation unit 1080 reads out, from the token counter 1120, the currently transmittable data capacity that corresponds to the PID of the packet information, according to the packet operation timing information. The operation unit 1080 obtains the updated currently transmittable data capacity by subtracting the packet length included in the packet information from the currently transmittable data capacity. In a case in which the currently transmittable data capacity is smaller than the packet length, the operation unit 1080 does not perform the subtraction processing. Also, an arrangement may be made in which, in a case in which the currently transmittable data capacity is smaller than zero, the operation unit 1080 does not perform the subtraction processing. The operation unit 1080 writes the updated currently transmittable data capacity thus obtained to the token counter 1120.

In a case in which the operation unit 1080 has not performed the subtraction processing, the operation unit 1080 transmits a discard flag that corresponds to the packet and the packet data that corresponds to the packet stored in the packet buffer 1050 to the downstream components. The discard flag indicates that there is a need to discard the corresponding packet.

In a case in which the operation unit 1080 has performed the subtraction processing, the operation unit 1080 transmits the packet data that corresponds to the packet stored in the packet buffer 1050 to the downstream components. In this case, the operation unit 1080 may transmit a transmittable flag. The transmittable flag indicates that there is no need to discard the corresponding packet.

[Time Chart of Standard Embodiment]

Figure 4:
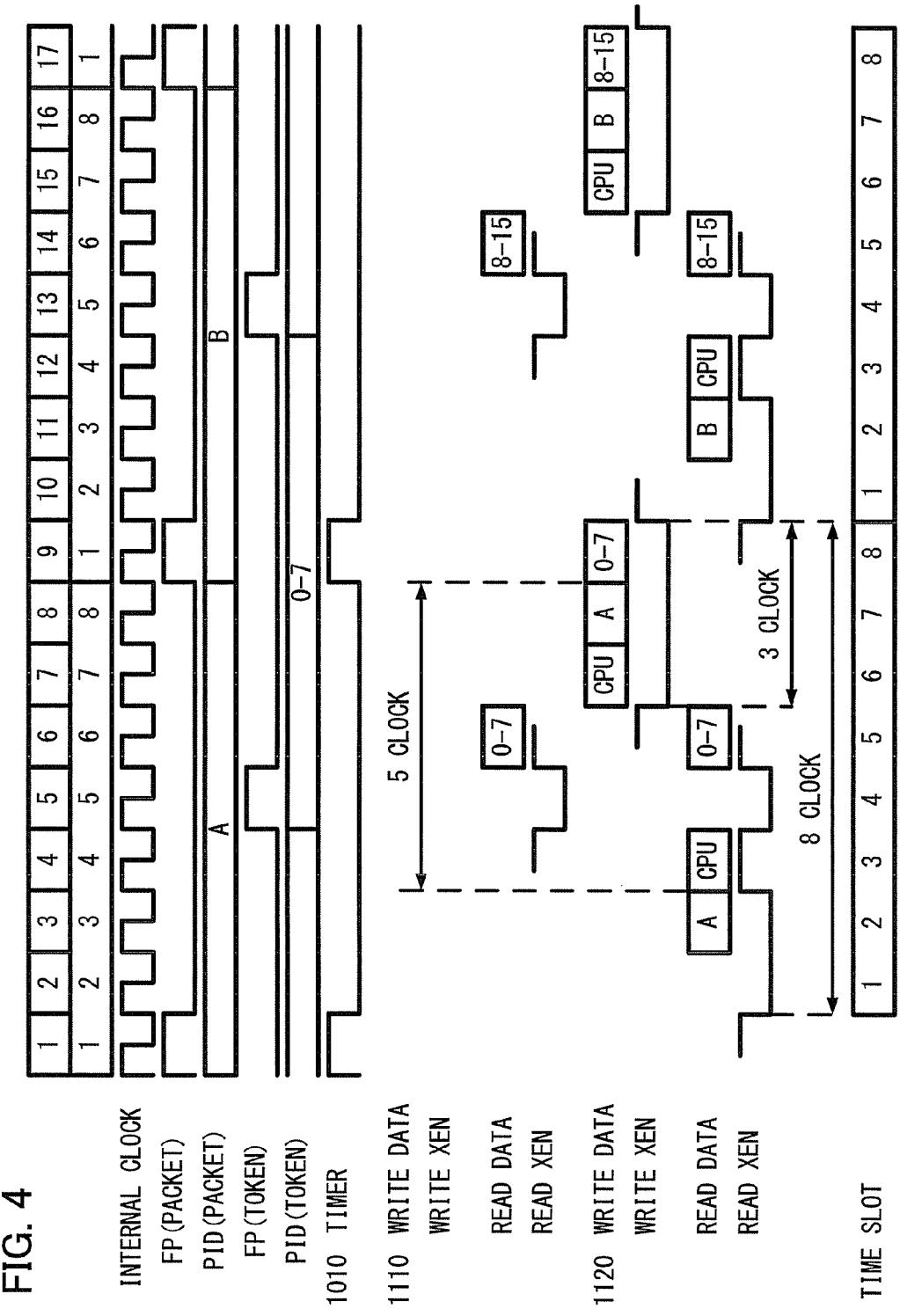
FIG. 4 is a diagram illustrating an example of a time chart according to a configuration of standard embodiment.

FIG. 4 is a diagram illustrating an example of a time chart for the configuration of standard embodiment. FIG. 4 illustrates an example of a policing device (or input rate monitoring function unit) with a 10 Gbps data capacity, operating at a 200 MHz clock speed (CLK). The policing device illustrated in FIG. 4 inputs a packet and supplies a token once every 8 clocks.

The horizontal direction of the time chart illustrated in FIG. 4 represents time. Here, the clock speed is 200 MHz. Accordingly, each time slot represents 1/200,000,000 second. An internal clock (internal CLK) generates a clock-pulse in increments of 1/200,000,000 second within the device. The packet FP represents the frame pulse of each input packet. Each packet is input to the policing device according to the frame pulse. The packet PID represents the PID of the input packet. In the example illustrated in FIG. 4, the packets are input in order of the packet with the PID "a" followed by the packet with the PID "b". The token FP represents the frame pulse of the token. The token PID represents the PID of the token to be processed in the next step. In this example, eight internal RAM units are provided, thereby enabling eight tokens to be processed at the same time. In the example illustrated in FIG. 4, the tokens with the PIDs 0 through 7 are processed at the same time. The timer indicates the operation timing information generated by the timer 1010.

"Write Data", "Write XEN (Write enable)", "Read DATA" and "Read XEN (Read enable)" for the token supply setting unit 1110 indicates the memory access band (timing) for reading/writing data from/to the token supply setting unit 1110.

"Write Data", "Write XEN (Write enable)", "Read DATA" and "Read XEN (Read enable)" for the token counter 1120 indicates the memory access band (timing) for reading/writing data from/to the token counter 1120.

When data is written, the "Write DATA" operation is performed in the time slot where the "WRITE XEN" is 0. That is to say, data is written at the same time as the memory access is performed. On the other hand, when data is read out, the "Read DATA" operation is performed at the time slot next to the time slot where the "Read XEN" is 0. That is to say, data is read out in the time slot subsequent to that of the memory access.

Description will be made regarding a method for assigning the memory access band (timing), with reference to the time slot numbers illustrated in the bottom row in FIG. 4.

In the time slot 1, the operation unit 1080 reads out the currently transmittable data capacity that corresponds to the PID "a" from the token counter 1120. In the time slot 2, an external circuit checks the currently transmittable data capacity. The time slot 3 is unusable (during computation). In the time slot 4, the token supply capacity, the currently transmittable data capacity, etc., for each of the PIDs 0 through 7, are read out from the token supply setting unit 1110 and the token counter 1120. The time slot 5 is unusable. In the time slot 6, the transmittable data capacity for the token counter 1120 that corresponds to the PID to be written in the next step is cleared. In the time slot 7, the currently transmittable data capacity which corresponds to the PID "a" and which the operation processing is performed, is written to the token counter 1120. In the time slot 8, the currently transmittable data capacities which correspond to the PIDs 0 through 7 and which the operation processing is performed, are written to the token counter 1120.

Accordingly, the update operation for updating the currently transmittable data capacity that corresponds to the input packet requires five clocks after the readout operation.

Furthermore, the update operation (update operation of the token counter 1120) for updating the currently transmittable data capacity according to the input packet and the token supply requires three clocks. Moreover, this cycle series requires eight clocks. The token supply operation is performed once every eight clocks, and eight internal RAM units are provided, thereby enabling eight PIDs to be processed every eight clocks.

First Embodiment

Next, description will be made regarding a first embodiment. The first embodiment is similar to the above-described configuration of standard embodiment. Accordingly, description will be made mainly regarding the difference therebetween.

FIG. 5 is a diagram illustrating another example of the time chart for the configuration of standard embodiment. FIG. 4 illustrates an example of the policing device (or input rate monitoring function unit) with a 10 Gbps data capacity, operating at a 200 MHz clock speed. FIG. 5 illustrates an example of the policing device (or input rate monitoring function unit) with a 20 Gbps data capacity, operating at a 200 MHz clock speed. Consequently, in the example illustrated in FIG. 5, two times more packets are input as compared with the example illustrated in FIG. 4. In the policing device illustrated in FIG. 5, a packet input operation is performed once every four clocks.

However, as described above, the update operation for updating the currently transmittable data capacity that corresponds to the input packet requires five clocks after the readout operation. Accordingly, in the example illustrated in FIG. 5, the next input packet is read out before the currently transmittable data capacity is updated. Accordingly, in a case in which the PID "a" and the PID "b" are the same PID, such an arrangement fails in the update operation for updating the currently transmittable data capacity. This is because a different readout operation is performed with the currently transmittable data capacity for the same PID before the currently transmittable data capacity is written to the token counter 1120.

Accordingly, such a configuration of standard embodiment cannot provide a policing device with a 20 Gbps data capacity, operating at a 200 MHz clock speed.

The first embodiment provides further increased data capacity and more detailed rate monitoring using an info-cache and a cache register.

[Configuration]

The first embodiment has the same network configuration as the configuration of standard embodiment illustrated in FIG. 1. Furthermore, the L2SW in the first embodiment has the same overall configuration as that of the L2SW illustrated in FIG. 2.

[Input Rate Monitoring Function Unit]

Figure 6:
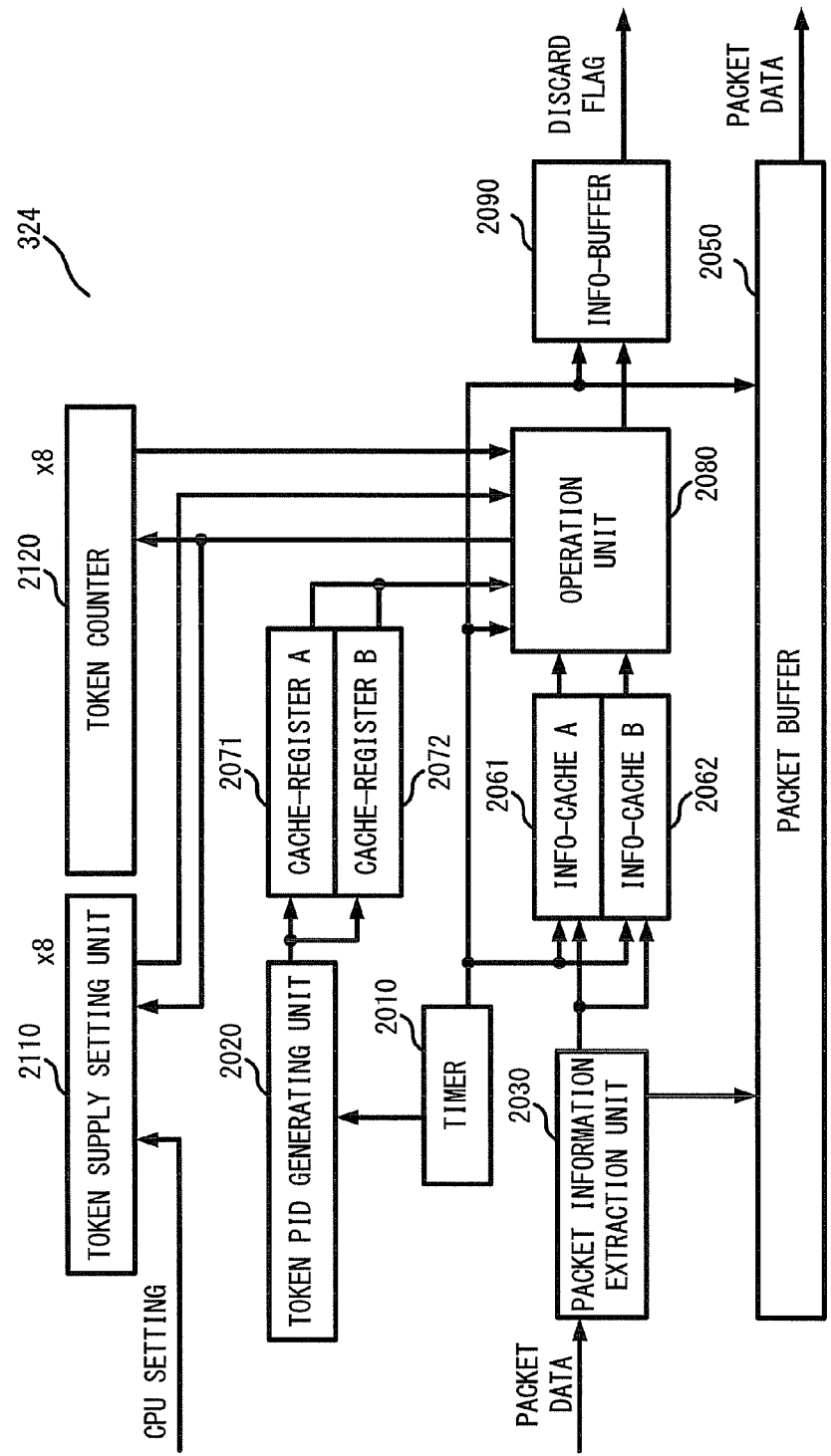
FIG. 6 is a diagram illustrating an example of the configuration of an input rate monitoring function unit according to the first embodiment.

FIG. 6 is a diagram illustrating an example of the configuration of the input rate monitoring function unit (policer) 324 according to the first embodiment. The input rate monitoring function unit (policer) 324 may be provided as an input rate monitoring function (policing) device.

The input rate monitoring function unit (policer) 324 includes a timer 2010, a token PID generating unit 2020, a packet information extraction unit 2030, a packet buffer 2050, an A-side info-cache unit (info-cache A) 2061, a B-side info-cache unit (info-cache B) 2062, an A-side cache register unit (cache-register A) 2071, a B-side cache register unit (cache-register B) 2072, a operation unit 2080, an info-buffer 2090, a token supply setting unit 2110 and a token counter 2120. Each of the token supply setting unit 2110 and the token counter 2120 can be realized as internal memory (storage medium).

The timer 2010 generates various kinds of timing information. The operation unit 2080 and so forth operate according to the timing information generated by the timer 2010.

The token PID generating unit 2020 generates the token PID of a token to be used to perform the token supply operation.

The packet information extraction unit 2030 extracts the packet information from the packet data. The packet information extraction unit 2030 transmits the packet data to the packet buffer 2050. The packet information extraction unit 2030 writes the packet information to the info-cache A unit 2061 or the info-cache B unit 2062. The writing destination is determined according to the timing information generated by the timer 2010.

The packet buffer 2050 holds the packet data during a period until the policing information is performed after the packet data has been received from the packet information extraction unit 2030.

Each of the info-cache A unit 2061 and the info-cache B unit 2062 holds the packet information. The timing information generated by the timer 2010 determines which info-cache unit (A or B) holds the packet information.

Each of the cache-register A unit 2071 and the cache-register B unit 2072 holds the token PID generated by the token PID generating unit 2020. The token PID is the PID of a token to be used to perform the token supply operation. The timing information generated by the timer 2010 determines which cache-register unit (A or B) holds the token PID.

The operation unit 2080 performs the policing operation processing based upon the packet information, the token PID, the data received from the token supply unit 2110 and the data received from the token counter 2120.

The info-buffer 2090 stores the packet transmittable information or the packet discard information based upon the operation result received from the operation unit 2080. The packet transmittable information or the packet discard information is transmitted to the downstream components in the form of a transmittable flag or a discard flag.

The token supply setting unit 2110 stores the allowable buffer size and the token supply capacity in increments of PIDs. In the example illustrated in FIG. 6, the input rate monitoring function unit (policer) 324 includes eight token supply setting units 2110, which enables eight PIDs to be processed at the same time. The token supply setting unit 2110 can be realized as internal RAM (Random Access Memory).

The token counter 2120 manages the currently transmittable data capacity in increments of PIDs. In the example illustrated in FIG. 6, the input rate monitoring unit (policer) 324 includes eight token counters 2120, which enables eight PIDs to be processed at the same time. The token counter 2120 can be realized as internal RAM (Random Access Memory).

[Operation]

[Packet Data Processing]

Upon receiving the packet data (main signal data), the packet information extraction unit 2030 extracts the packet information from the packet data thus received. The packet information extraction unit 2030 writes the packet information thus extracted to the info-cache A unit 2061 or the info-cache B unit 2062 based upon the timing information generated by the timer 2010. Furthermore, the packet information extraction unit 2030 stores the packet data thus received in the packet buffer 2050.

The packet data stored in the packet buffer 2050 is transmitted to the downstream components along with the transmittable flag or the discard flag that corresponds to the packet data.

[Policing Operation Processing]

The token supply setting unit 2110 writes and holds the transmittable data capacity (token supply capacity) during a predetermined period (token period), the allowable burst size and the valid/invalid PID settings, in increments of PIDs, according to CPU settings from an external circuit.

The info-cache unit is a two-sided configuration including the info-cache A unit 2061 and the info-cache B unit 2062. At the timing at which the packet information extraction unit 2030 writes the packet information to the info-cache unit A 2061, the operation unit 2080 performs operation using the packet information stored in the info-cache B unit 2062. Conversely, at a timing at which the packet information extraction unit 2030 writes the packet information to the info-cache B unit 2062, the operation unit 2080 performs operation using the packet information stored in the info-cache A unit 2061.

Furthermore, the cache register unit is a two-sided configuration including the cache-register A unit 2071 and the cache-register B unit 2072. At the timing at which the token PID generating unit 2020 writes the token PID to the cache register A unit 2071, the operation unit 2080 performs operation using the token PID stored in the cache-register B unit 2072. Conversely, at the timing at which the token PID generating unit 2020 writes the token PID to the cache-register B unit 2072, the operation unit 2080 performs operation using the token PID stored in the cache register A unit 2071.

The operation unit 2080 compares the PID of the packet information read out from the info-cache unit (2061 or 2062) with the token PID read out from the cache-register unit (2071 or 2072), and generates a match/mismatch flag.

Furthermore, the operation unit 2080 consecutively accesses the token supply setting unit 2110 and the token counter 2120, and reads out the allowable burst size, the token supply capacity and the currently transmittable data capacity, for each PID, using the packet PID (Packet PID, i.e., PPID) and the token PID (Token PID, i.e., TPID).

The operation unit 2080 performs the policing operation by using the match/mismatch flag between PPID and TPID, the packet length of each PPID, the allowable burst size, the token supply capacity and the currently transmittable data capacity.

The operation unit 2080 obtains an updated currently transmittable data capacity (which will be denoted by "B") by adding the token supply capacity to the currently transmittable data capacity (which will be denoted by "A"). In a case in which the updated currently transmittable data capacity exceeds the allowable burst size, the operation unit 2080 employs the allowable burst size as the updated transmittable data capacity (B).

Furthermore, the operation unit 2080 obtains an updated currently transmittable data capacity (which will be denoted by "C") by subtracting the packet length from the currently transmittable data capacity (B) thus operated, in increments of the PIDs of the input packets. In a case in which the currently transmittable data capacity (B) is smaller than the packet length, the operation unit 2080 does not perform the subtraction processing. Also, an arrangement may be made in which, in a case in which the currently transmittable data capacity (B) is smaller than zero, the operation unit 2080 does not perform the subtraction processing. In a case in which the subtraction processing has not been performed, the currently transmittable data capacity (B) is employed as the updated currently transmittable data capacity (C).

The operation unit 2080 writes the updated currently transmittable data capacity (C) to the token counter 2120.

In a case in which the operation unit 2080 has not performed the subtraction processing, the operation unit 2080 notifies the info-buffer 2090 of the discard information with respect to the corresponding packet. In a case in which the operation unit 2080 has performed the subtraction processing, the operation unit 2080 instructs the info-buffer 2090 to store the transmittable information with respect to the corresponding packet.

The info-buffer 2090 transmits, to the downstream components, the transmittable information or the discard information with respect to the packet in the form of a transmittable flag or a discard flag, according to the timing information received from the timer 2010.

[Processing Flow]

Figure 7:
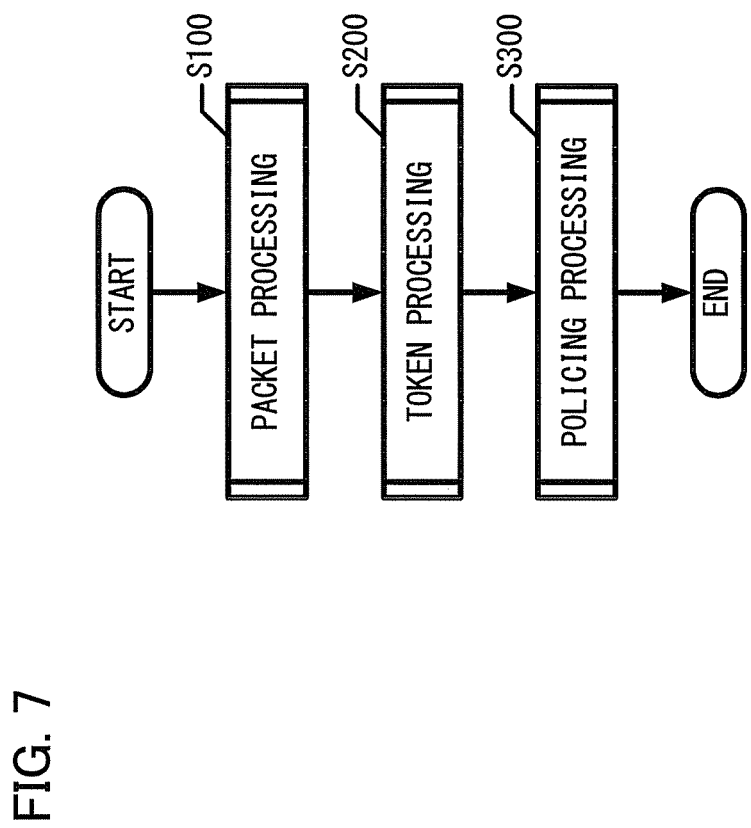
FIG. 7 is a diagram illustrating an example of the overall processing flow.

FIG. 7 is a diagram illustrating an example of the overall processing flow.

The input rate monitoring unit (policer) 324 performs the packet processing (S100) for an input packet, performs the token processing (S200) for supplying a token and performs the policing processing (S300) based upon the processing results thus obtained. The order of the packet processing (S100) and the token processing (S200) may be reversed. Also, these steps may be processed in parallel.

Figure 8:
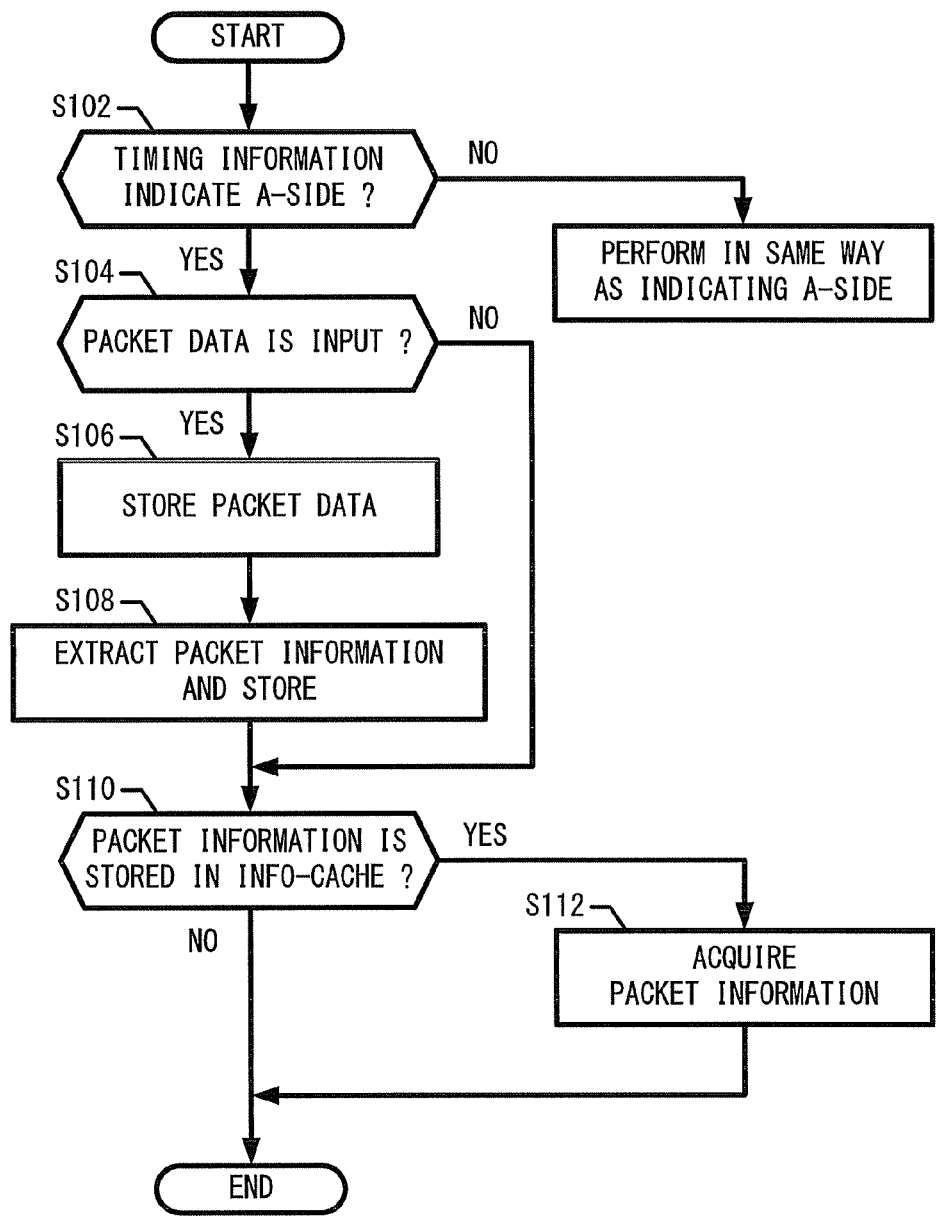
FIG. 8 is a diagram illustrating an example of the flow of the packet processing illustrated in FIG. 7.

FIG. 8 is a diagram illustrating an example of the flow of the packet processing (S100) illustrated in FIG. 7.

The timer 2010 notifies the info-cache unit of the timing information for processing the input packet. The timing information is the information which determines whether the packet information with respect to the input packet is to be stored in the info-cache A unit 2061 or the info-cache B unit 2062.

The packet information extraction unit 2030 checks the timing information transmitted to the info-cache unit (S102). In a case in which the timing information indicates the B-side (S102; NO), the processing is performed in the same way as in a case in which the timing information indicates the A-side described below. In a case in which the timing information indicates the A-side (S102; YES), the packet information extraction unit 2030 checks whether or not the packet data has been input (S104). In a case in which the packet data has not been input (S104; NO), the flow proceeds to Step S110.

In a case in which the packet has been input (S104; YES), the packet information extraction unit 2030 stores the packet data in the packet buffer 2050 (S106). Furthermore, the packet information extraction unit 2030 extracts the packet information from the packet data thus input, and stores the packet information thus extracted in the info-cache A unit 2061 (S108).

The operation unit 2080 checks whether or not the packet information is stored in the info-cache B unit 2062 (S110). In a case in which the packet information is not stored (S110; NO), the packet processing ends. In a case in which the packet information is stored (S110; YES), the operation unit 2080 acquires the packet information from the info-cache B unit 2062 (S112). The packet information includes the PID of the packet and the packet length.

The above is the packet processing (FIG. 7; S100).

Figure 9:
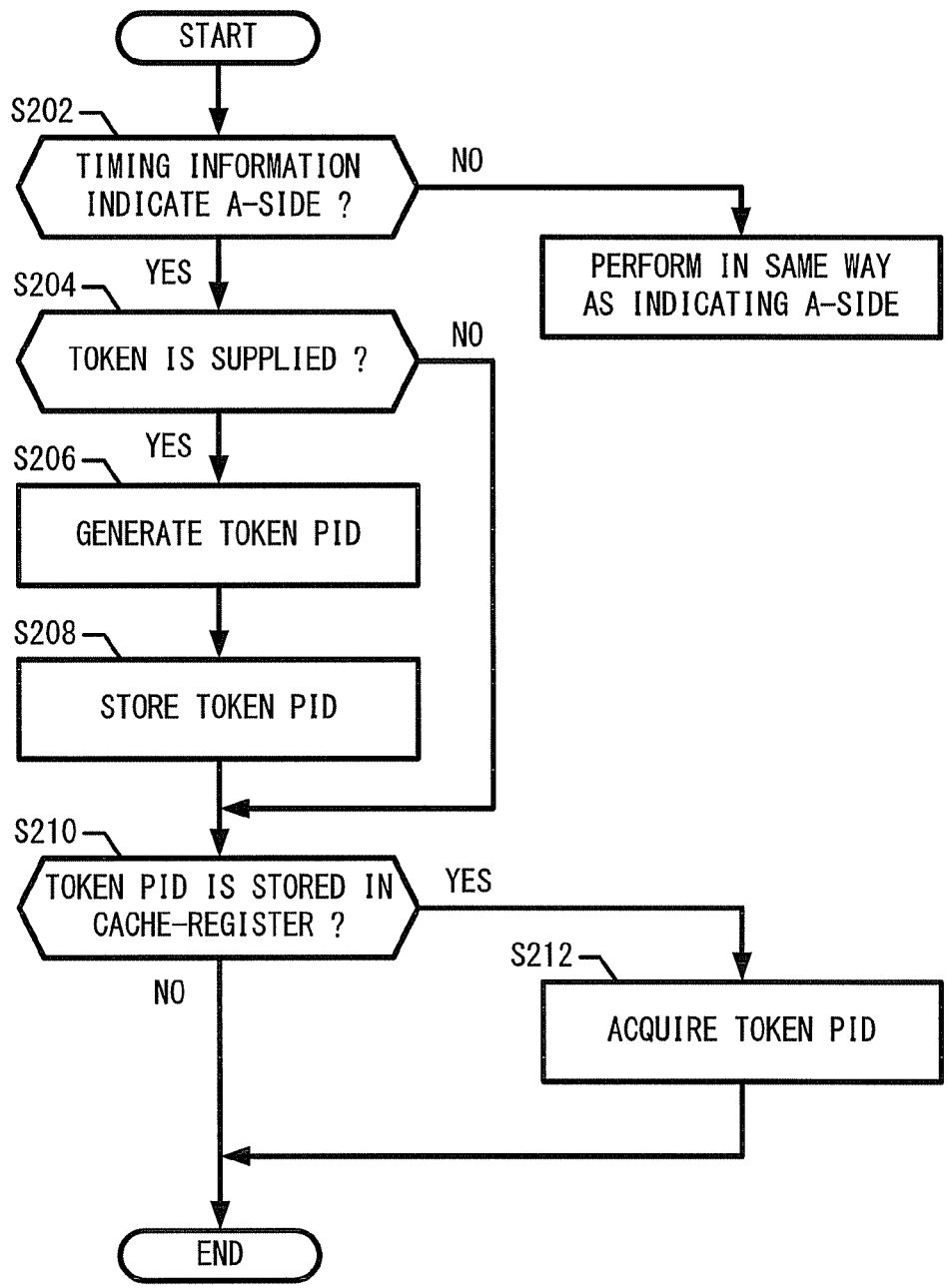
FIG. 9 is a diagram illustrating an example of the flow of the token processing illustrated in FIG. 7.

FIG. 9 is a diagram illustrating an example of the flow of the token processing (S200) illustrated in FIG. 7.

The timer 2010 notifies the token PID generating unit 2020 of the timing information for performing the token supply processing. The timing information is the information which determines whether the token PID is to be stored in the cache-register A unit 2071 or the cache-register B unit 2072.

The token PID generating unit 2020 checks the timing information transmitted from the timer 2010 (S202). In a case in which the timing information indicates the B-side (S202; NO), the processing is performed in the same way as in a case in which the timing information indicates the A-side described below. In a case in which the timing information indicates the A-side (S202; YES), the token PID generating unit 2020 checks whether or not the token is to be supplied (S204). In a case in which the token has not been supplied (S204; NO), the flow proceeds to Step S210.

In a case in which a token is to be supplied (S204; YES), the token PID generating unit 2020 generates a token PID (S206). The token PID generating unit 2020 stores the token PID thus generated in the cache-register A unit 2071 (S208).

The operation unit 2080 checks whether or not the cache-register B unit 2072 stores the token PID (S210). In a case in which the token PID is not stored (S210; NO), the token processing ends. In a case in which the token PID is stored (S210; YES), the operation unit 2080 acquires the token PID from the cache-register B unit 2062 (S212).

The above is the token processing (FIG. 7; S200).

Figure 10:
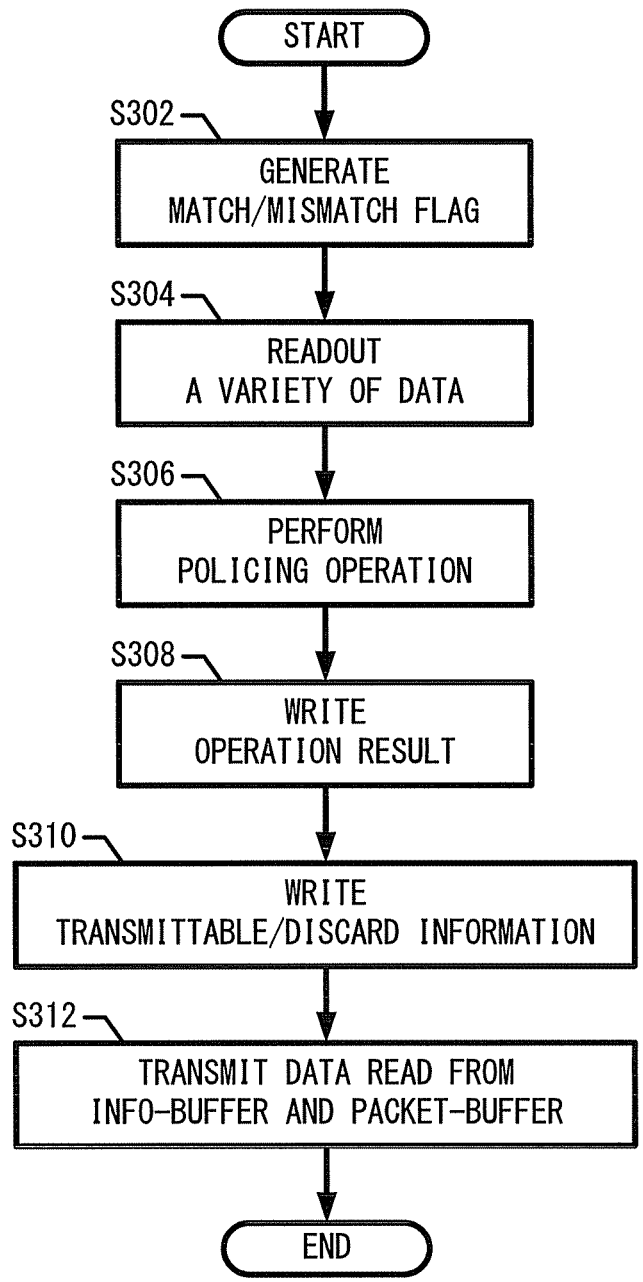
FIG. 10 is a diagram illustrating an example of the flow of the policing processing illustrated in FIG. 7.
Figure 11:
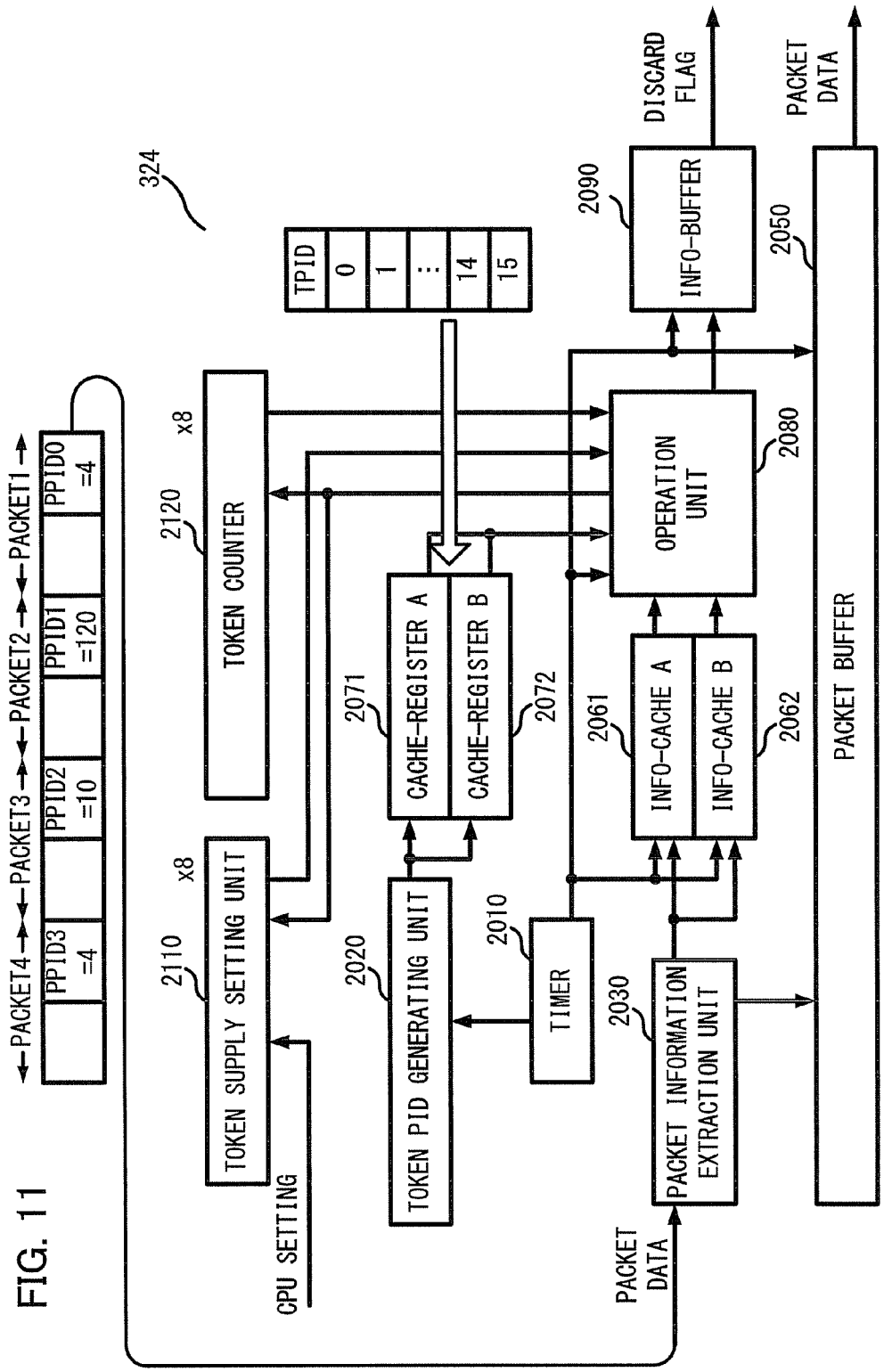
FIG. 11 is a diagram illustrating a specific example of a packet input operation.

FIG. 10 is a diagram illustrating an example of the flow of the policing processing (S300) illustrated in FIG. 7.

The operation unit 2080 compares the PID of the packet information acquired from the info-cache unit (2061 or 2062) with the token PID acquired from the cache-register unit (2071 or 2072), and generates a match/mismatch flag (S302).

The operation unit 2080 consecutively accesses the token supply setting unit 2110 and the token counter 2120, and reads out the allowable burst size, the token supply capacity and the currently transmittable data capacity, for each PID thus acquired (S304).

The operation unit 2080 performs the policing operation using the match/mismatch flag, the packet length, the allowable burst size, the token supply capacity and the currently transmittable data capacity for each PPID (S306).

The operation unit 2080 writes the operation results, i.e., the currently transmittable data capacity to the token counter 2120 in increments of PIDs (S308).

The operation unit 2080 writes the transmittable information or the discard information to the info-buffer 2090 (S310). In a case in which the packet length of the packet cannot be subtracted from the currently transmittable data capacity, the determination is made that the packet is to be discarded.

The info-buffer 2090 transmits the transmittable information or the discard information stored in the info-buffer 2090 to the downstream components in the form of a transmittable flag or a discard flag, according to the timing information received from the timer 2010. At the same time, the packet data that corresponds to the flag is transmitted from the packet buffer 2050 to the downstream components (S312).

The above is the policing processing (FIG. 7; S300).

[Specific Example]

FIG. 11, FIG. 12, FIG. 13 and FIG. 14 are diagrams illustrating a specific example of the packet input operation.

Description will be made regarding a case in which four packets are consecutively input. For example, the PIDs (PPIDs) of the packets are "4", "120", "10" and "4", which are listed in the input order. Furthermore, for example, the PIDs (TPID) for performing the token supply operation are "0", "1", ..., "14" and "15".

Figure 12:
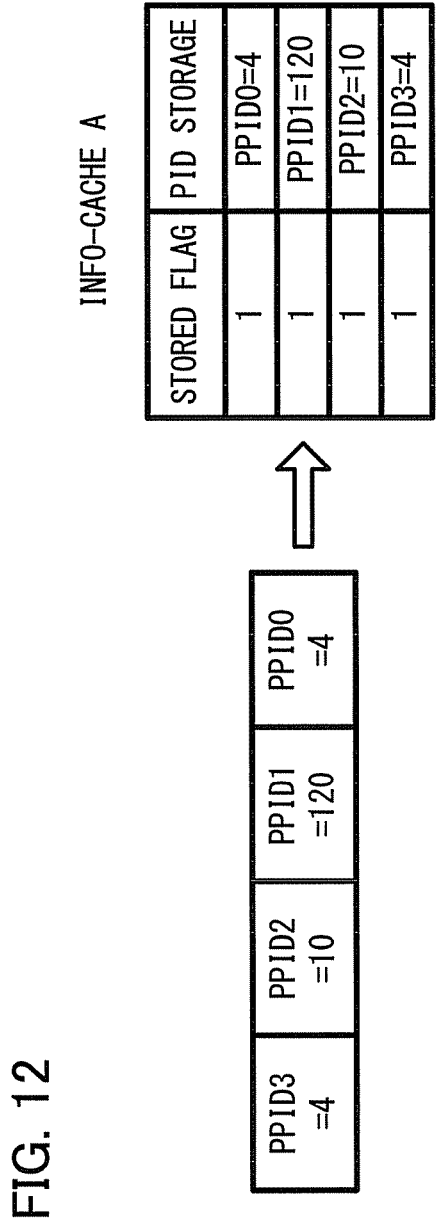
FIG. 12 is a diagram illustrating a specific example of the packet input operation.
Figure 13:
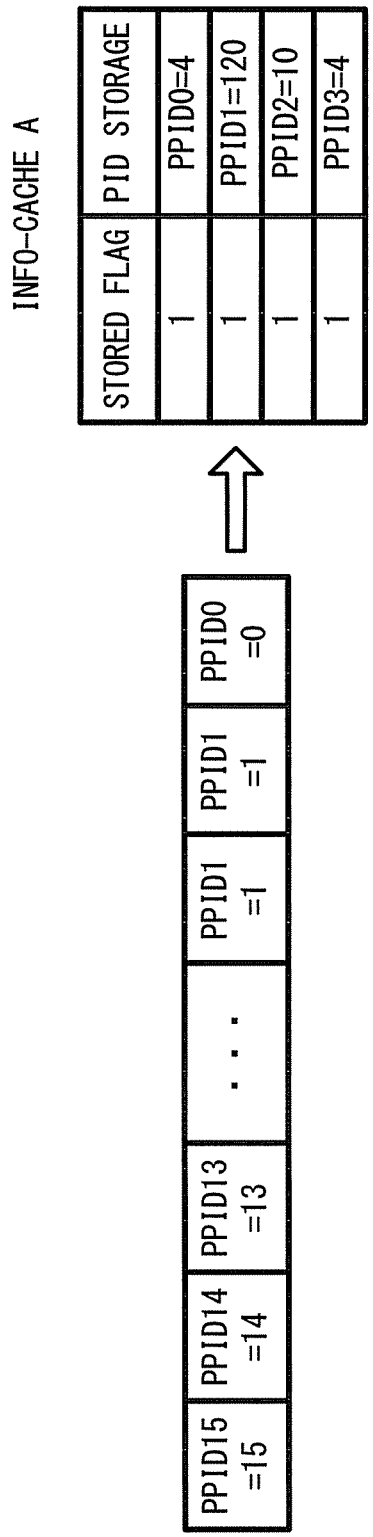
FIG. 13 is a diagram illustrating a specific example of the packet input operation.

In a case in which the timing information for processing an input packet indicates the A-side, the PPID is stored in the info-cache A unit 2061 as illustrated in FIG. 12. Furthermore, in a case in which the timing information for processing a token indicates the A-side, the TPID for supplying the token is stored in the cache-register unit A 2071 as illustrated in FIG. 13. When each of the PPIDs and the TPIDs is stored, the corresponding storage flag is set up.

When the timing information for the input packet processing and/or the timing information for the token processing are/is switched to those which indicate the B-side, the operation unit 2080 reads out the PPID from the info-cache A unit 2061, and/or reads out the TPID from the cache-register A unit 2071.

Figure 14:
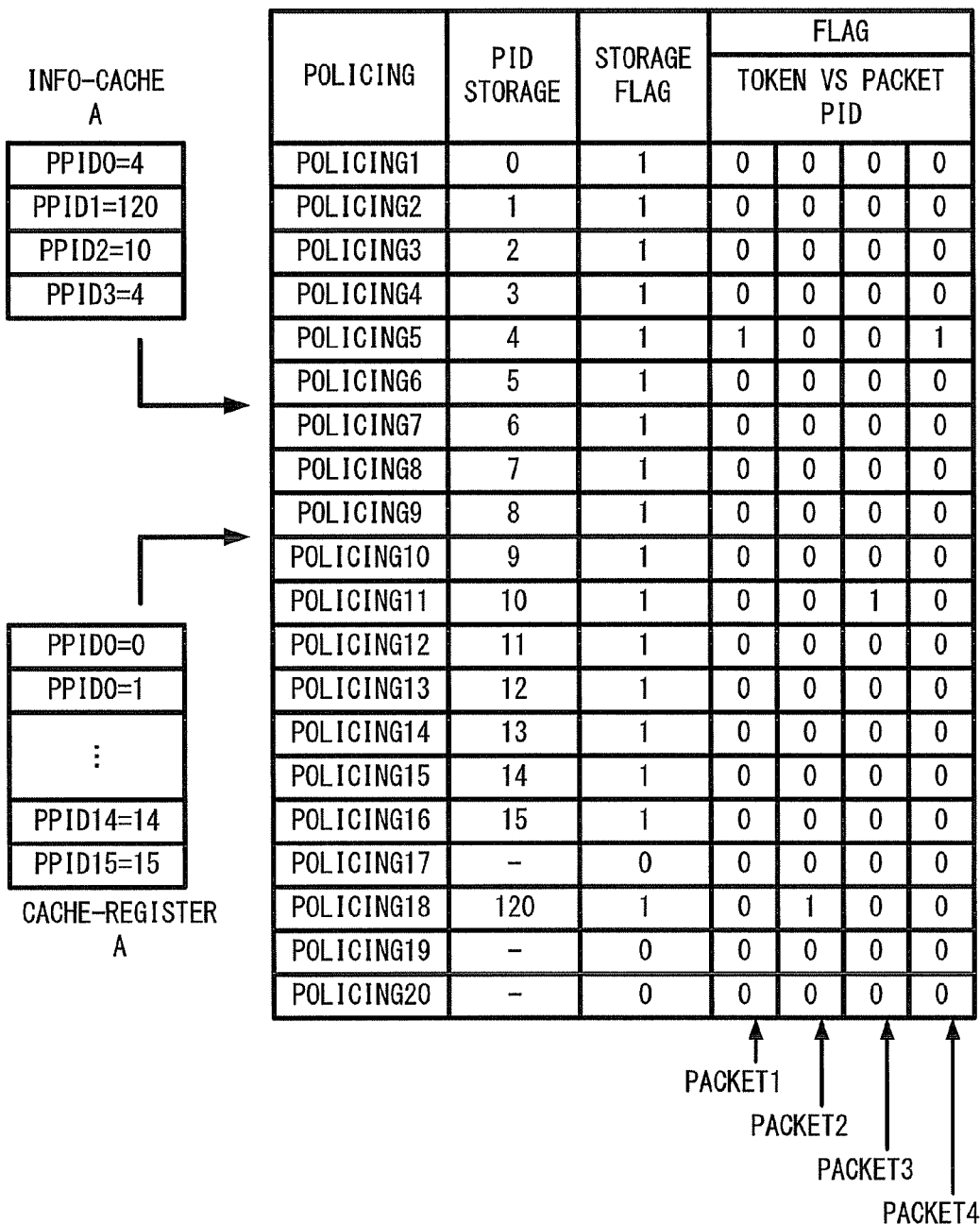
FIG. 14 is a diagram illustrating a specific example of the packet input operation.

The operation unit 2080 makes a comparison between the PPIDs and the TPIDs thus read out, and generates a match/mismatch flag for each PID as illustrated in FIG. 14.

The operation unit 2080 includes policing circuits 1 through 20 (policing 1 through 20). Of these policing circuits, the operation unit 2080 stores the TPIDs in the policing circuits 1 through 16. The operation unit 2080 sets up a storage flag when the TPID is stored. Subsequently, the operation unit 2080 makes a comparison between the PPIDs and the TPIDs. In a case in which the same PID has been detected, a match flag is set up. In a case in which the same PID has not been detected, the operation unit 2080 stores the corresponding token TPID in one of the policing circuits 17 through 20, and a match flag is set up.

After generating the match/mismatch flags, the operation unit 2080 performs the policing operation for each of the PIDs stored in the policing circuits 1 through 20 with the match flag being in the ON state, using the data read out from the token supply setting unit 2110 and the token counter 2120.

The operation unit 2080 writes, to the token counter 2120, the results obtained by performing the policing operation.

Figure 15:
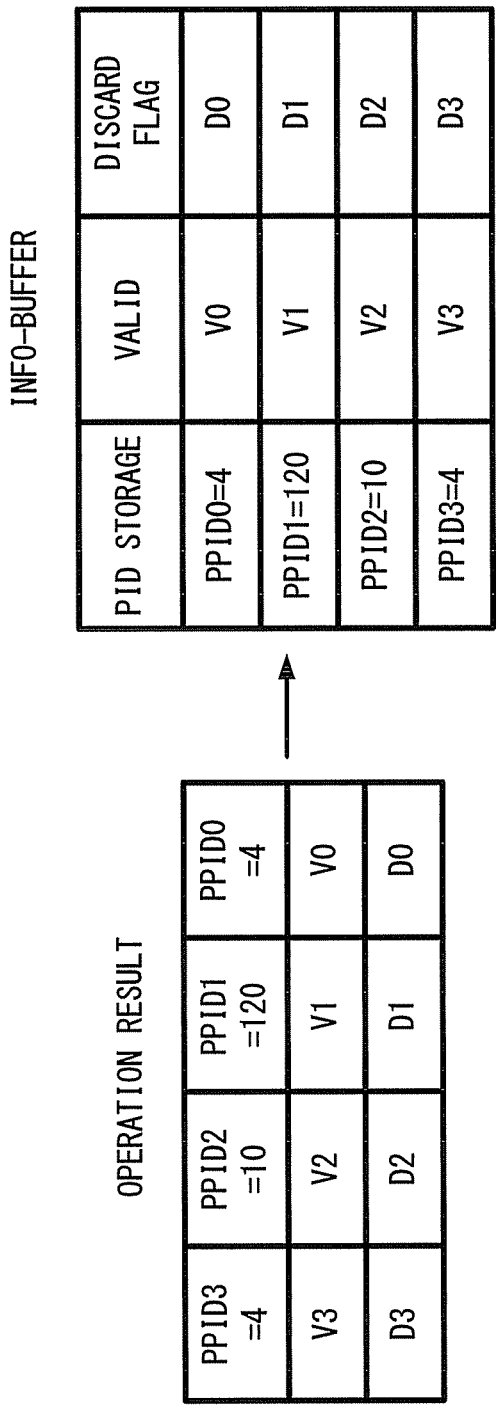
FIG. 15 is a diagram illustrating operation results obtained by a operation unit and an example of the storage example of an info-buffer.

FIG. 15 is a diagram illustrating the operation results obtained by the operation unit 2080 and an example of the storage operation of the info-buffer.

The operation unit 2080 stores, in the info-buffer 2090, the information which indicates whether the packet is valid or invalid and the information which determines whether or not the packet is to be discarded (transmittable/discard information). The information which indicates whether the packet is valid or invalid represents the information which indicates the presence or absence of the packet. For example, in a case in which the packet has not been input, this information indicates that the packet is invalid.

Figure 16:
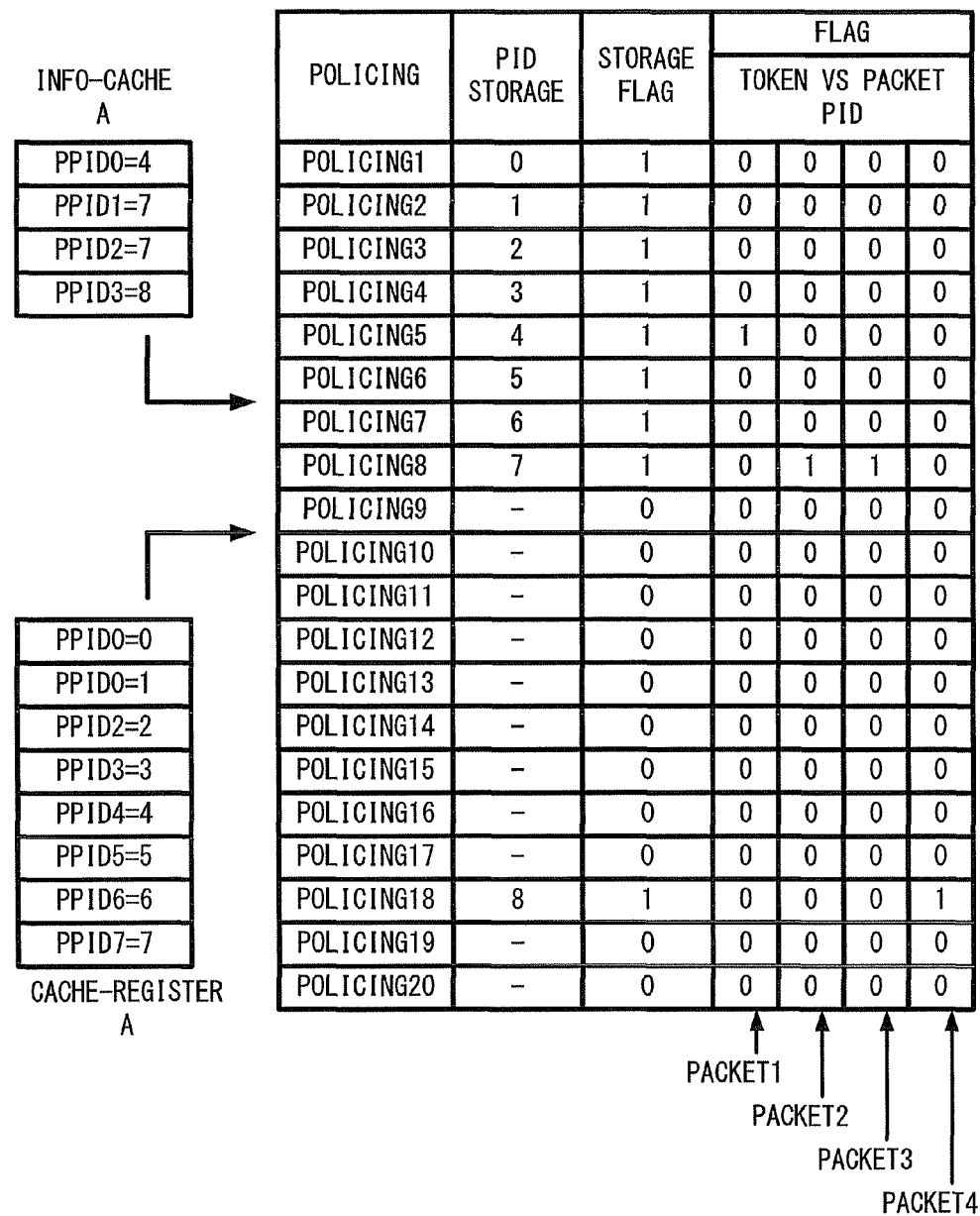
FIG. 16 is another specific example of the packet input operation.

FIG. 16 is a diagram illustrating another specific example of the packet input operation.

Description will be made regarding a case in which four packets are consecutively input. For example, that the PIDs (PPIDs) of the packets are "4", "7", "7" and "8", which are listed in the input order. Furthermore, for example, the PIDs (TPID) for performing the token supply operation are "0", "1", ..., and "7".

In this case, two packets (Packet 2 and Packet 3) with the same PPID, i.e. "7", are input. Furthermore, there is a token with the TPID of "7". Accordingly, the match flag for the PID "7" is set up for the two packets.

FIG. 17 is a diagram illustrating an example of the configuration of the token supply setting unit.

The token supply setting unit 2110 has information with respect to the "ON/OFF" setting which indicates whether the PID is valid or invalid, the information with respect to the burst setting which indicates the allowable burst size, and the information with respect to the token setting which indicates the token supply capacity for each operation, in increments of PIDs. In a case in which the "ON/OFF" setting is in the OFF state, the, the setting indicates that the PID is invalid, and the policing operation is not performed for the corresponding PID. Furthermore, the packet having this PID is not discarded. The token supply setting unit 2110 can be rewritten by accessing the token supply setting unit 2110 from an external CPU or the like.

FIG. 18 is a diagram illustrating an example of the configuration of the token counter unit.

The token counter 2120 has information with respect to the "ON/OFF" setting which indicates whether the operation is being performed for the PID, and the token counter information which indicates the currently transmittable data capacity, in increments of PIDs. The token counter 2120 can be rewritten by the operation unit 2080.

[Time Chart]

Figure 19A:
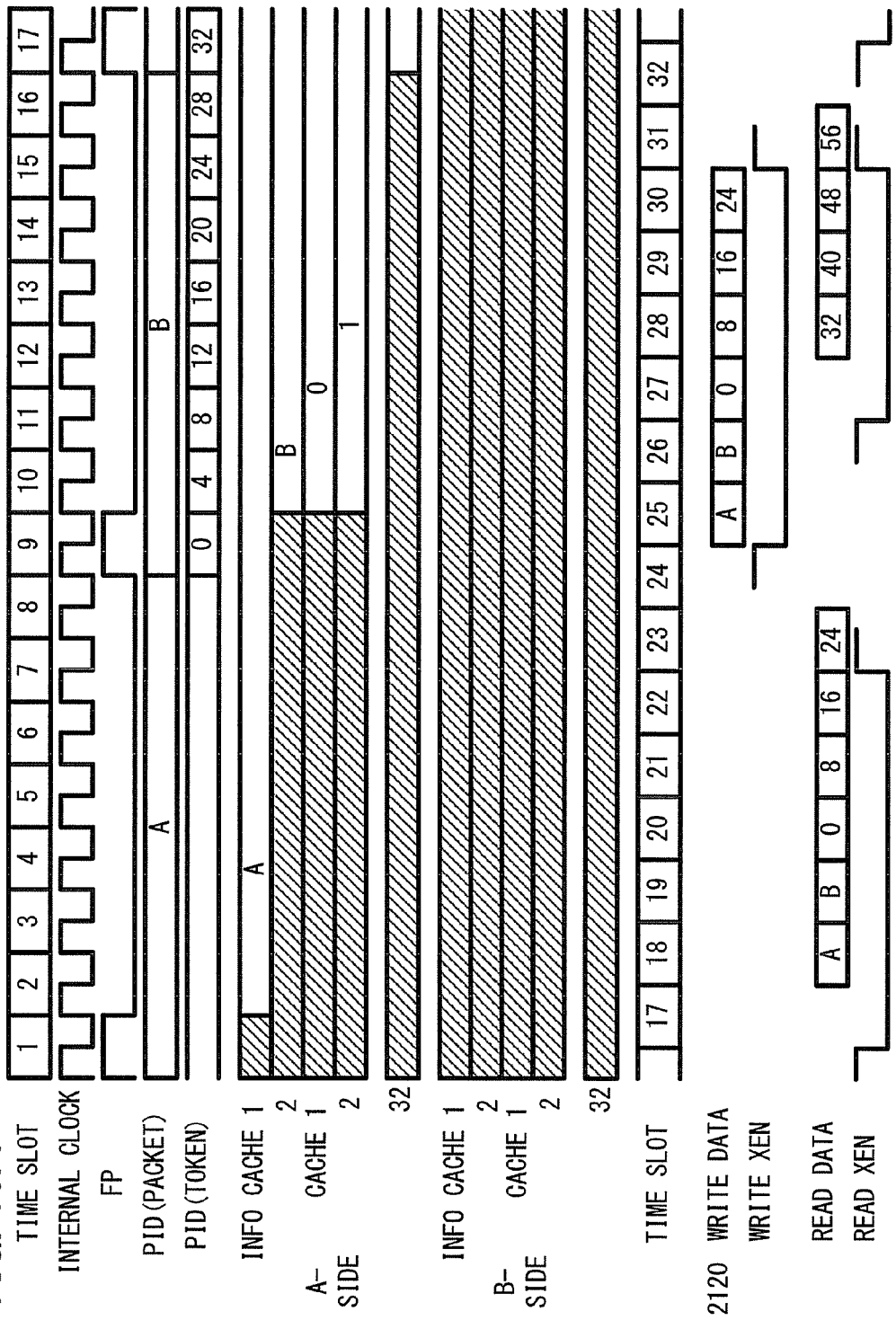

FIGS. 19A and 19B are diagrams illustrating an example of the time chart for the first embodiment. FIGS. 19A and 19B illustrate an example of a policing device (or input rate monitoring function unit 324) with a 10 Gbps data capacity, operating at a clock speed (CLK) of 200 MHz. With the policing device illustrated in FIGS. 19A and 19B, the packet input operation is performed once every eight clocks, and the token supply operation is performed four times every one clock.

The horizontal direction of the time chart illustrated in FIGS. 19A and 19B represents time. The time slots illustrated in the top view represent the time slots for the internal clock, the FP, the PIDs of the packets, the PIDs of the tokens, the A-side info-cache unit, the A-side cache-register unit, the B-side info-cache unit and the B-side cache-register unit. The time slots illustrated in the middle view represent the time slots for the "Write DATA", "Write XEN (Write enable)", "Read DATA" and "Read XEN (Read enable)". The information illustrated in each row represents the packet information or the token PID stored in the info-cache unit or the cache-register unit.

In the example illustrated in FIGS. 19A and 19B, a packet is input every eight clocks. Furthermore, 32 tokens are processed every eight clocks.

The packet information is extracted from the input packet. The packet information is alternately stored in the A-side info-cache (info-cache A) unit 2061 and the B-side info-cache (info-cache B) unit 2062 in increments of two packets. The packet information includes the PID of the packet and the packet length. Also, an arrangement may be made in which the number of the packet information items stored in the info-cache unit can be changed according to the data capacity or the like.

Furthermore, the token PIDs used for the token supply operation are generated by the token PID generating unit 2020. The token PIDs thus generated are alternately stored in the A-side cache register (cache-register A) unit 2071 and the B-side cache register (cache-register B) unit 2072 in increments of 32 token PIDs.

In the example illustrated in FIGS. 19A and 19B, in the time slots 1 through 8, a packet with the PID of "a" is input. In the time slots 9 through 16, a packet with the PID of "b" is input. The packet information with respect to the packets thus input is input to the info-cache A unit 2061. In the time slots 17 through 24, a packet with the PID of "c" is input. In the time slots 25 through 32, a packet with the PID of "d" is input. The packet information with respect to the packets thus input is input to the info-cache B unit 2062.

Furthermore, in the time slots 9 through 16, the token PIDs with the PIDs of 0 through 31 are generated, and the token PIDs thus generated are input to the cache-register A unit 2071. Moreover, in the time slots 17 through 24, the token PIDs with the PIDs of 32 through 63 are generated, and the token PIDs thus generated are input to the cache-register B unit 2072.

In the time slots 17 and 18, the operation unit 2080 reads out, from the token counter 2120, the token counter (currently transmittable data capacity) for each of the PIDs "a" and "b". Furthermore, in the time slots 19 through 22, the operation unit 2080 reads out the token counters with the PIDs of "0" through "31". There are eight internal memory units (storage media). Accordingly, 32 token counters can be read out every four clocks.

The operation unit 2080 performs the policing operation based upon the information thus read out etc. In the time slots 25 through 30, the operation unit 2080 writes the operation results to the token counter 2120.

In the time slots 27 through 30, the operation unit 2080 reads out the token counters with the token PIDs of "32" through "63". In this case, the time slots for the readout operation overlap the time slots for the writing operation described above. However, the token PID is incremented from zero to a predetermined number (1023, in this case). Thus, the operations with the same PID are not performed in the overlapping time slots.

The operation unit 2080 performs the policing operation based upon the information thus read out etc. In the time slots 35 through 38, the operation unit 2080 writes the operation results to the token counter 2120.

Accordingly, in the example illustrated in FIGS. 19A and 19B, the token supply processing can be performed four times every one clock. Thus, such an arrangement is capable of processing 32 PIDs of tokens every eight clocks.

FIGS. 20A and 20B are diagrams illustrating another example of the time chart for the first embodiment. FIGS. 20A and 20B illustrate an example of a policing device (or input rate monitoring function unit 324) with a 20 Gbps data capacity, operating at a clock speed (CLK) of 200 MHz. With the policing device illustrated in FIGS. 20A and 20B, the packet input operation is performed once every four clocks, and the token supply operation is performed twice every one clock.

In the example illustrated in FIGS. 20A and 20B, a packet is input every four clocks. Furthermore, 16 tokens are processed every eight clocks.

The packet information is extracted from the input packet. The packet information is alternately stored in the A-side info-cache (info-cache A) unit 2061 and the B-side info-cache (info-cache B) unit 2062 in increments of four packets. The packet information includes the PID of the packet and the packet length.

Furthermore, the token PIDs used for the token supply operation are generated by the token PID generating unit 2020. The token PIDs thus generated are alternately stored in the A-side cache register (cache-register A) unit 2071 and the B-side cache register (cache-register B) unit 2072 in increments of 16 token PIDs.

In the example illustrated in FIGS. 20A and 20B, in the time slots 1 through 4, a packet with the PID of "a" is input. In the time slots 5 through 8, a packet with the PID of "b" is input. The packet information with respect to the packets thus input is input to the info-cache A unit 2061. In the time slots 9 through 12, a packet with the PID of "c" is input. In the time slots 13 through 16, a packet with the PID of "d" is input. The packet information with respect to the packets thus input is also input to the info-cache A unit 2061.

Furthermore, in the time slots 9 through 16, the token PIDs with the PIDs of 0 through 15 are generated, and the token PIDs thus generated are input to the cache-register A unit 2071. Moreover, in the time slots 17 through 24, the token PIDs with the PIDs of 16 through 31 are generated, and the token PIDs thus generated are input to the cache-register B unit 2072.

In the time slots 17 through 20, the operation unit 2080 reads out, from the token counter 2120, the token counter (currently transmittable data capacity) for each of the PIDs "a", "b", "c" and "d". Furthermore, in the time slots 21 and 22, the operation unit 2080 reads out the token counters with the PID of "0" through "15". There are eight internal memory (storage medium) units. Accordingly, 16 token counters can be read out every two clocks.

The operation unit 2080 performs the policing operation based upon the information thus read out etc. In the time slots 25 through 30, the operation unit 2080 writes the operation results to the token counter 2120.

In the time slots 29 and 30, the operation unit 2080 reads out the token counters with the token PIDs of "16" through "31". In this case, the time slots for the readout operation overlap the time slots for the writing operation described above. However, the token PID is incremented from zero to a predetermined number (1023, in this case). Thus, the operations with the same PID are not performed in the overlapping time slot.

The operation unit 2080 performs the policing operation based upon the information thus read out etc. In the time slots 37 and 38, the operation unit 2080 writes the operation results to the token counter 2120.

Accordingly, in the example illustrated in FIGS. 20A and 20B, the token supply processing can be performed twice every one clock. Thus, such an arrangement is capable of processing 16 PIDs of tokens every eight clocks.

With the first embodiment, cache registers and so forth are included within a device, which enables memory access to be performed in a burst manner (consecutively), thereby providing the rate monitoring for data with large data capacity. Furthermore, the first embodiment allows the token supply operation to be performed with high frequency as compared with the standard embodiment.

The first embodiment provides higher-frequency token supply operation, thereby enabling more detailed rate monitoring to be performed.

Second Embodiment

Next, description will be made regarding a second embodiment. The second embodiment is similar to the above-described standard embodiment and the first embodiment. Accordingly, description will be made mainly regarding the difference therebetween.

The first embodiment has a configuration including the internal memory (storage medium). On the other hand, the second embodiment has a configuration including external memory (storage medium).

[Configuration]

The second embodiment has the same network configuration as that of the configuration illustrated in FIG. 1. Furthermore, the L2SW in the second embodiment has the same overall configuration as that of the LS2W illustrated in FIG. 2.

[Input Rate Monitoring Function Unit]

Figure 21:
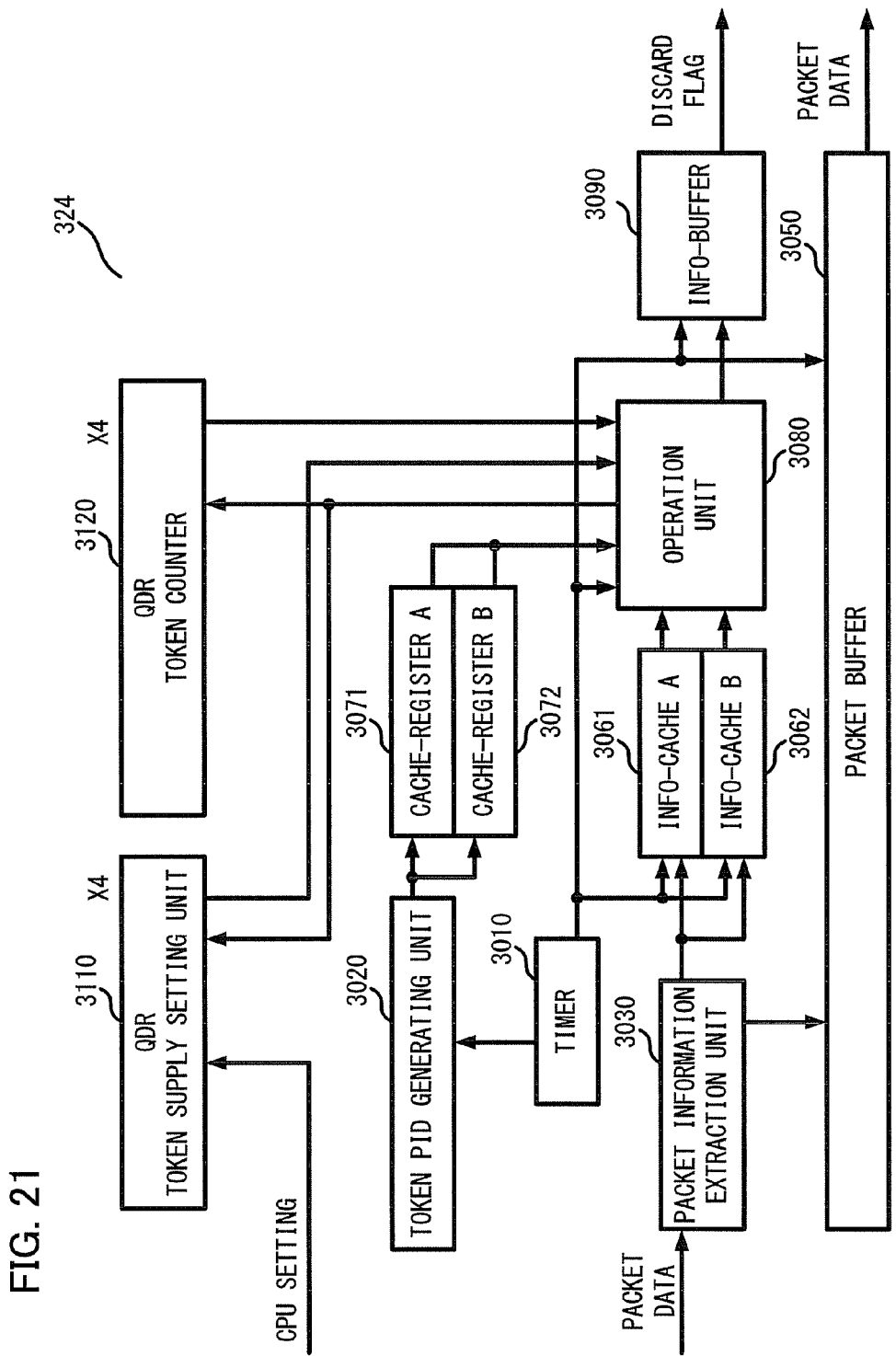
FIG. 21 is a diagram illustrating an example of the configuration of an input rate monitoring function unit according to the second embodiment.

FIG. 21 is a diagram illustrating an example of the configuration of an input rate monitoring function unit according to the second embodiment. The input rate monitoring function unit may be provided as an input rate monitoring function (policing) device.

The input rate monitoring function unit (policer) 324 includes a timer 3010, a token PID generating unit 3020, a packet information extraction unit 3030, a packet buffer 3050, an A-side info-cache unit (info-cache A) 3061, a B-side info-cache unit (info-cache B) 3062, an A-side cache register unit (cache-register A) 3071, a B-side cache register unit (cache-register B) 3072, a operation unit 3080, an info-buffer 3090, a token supply setting unit 3110 provided in the form of QDR (Quad Data Rate) memory (external storage medium), and a token counter 3120 provided in the form of QDR memory (external storage medium).

The components other than the token supply setting unit 3110 and the token counter 3120 are the same as the corresponding components in the first embodiment. Furthermore, the token supply setting unit 3110 and the token counter 3120 have the same functions as those in the first embodiment, except that they are provided in the form of external memory (external storage medium) unlike the first embodiment employing the internal memory (internal storage medium).

In general, an arrangement employing external memory has a problem of latency of memory access (delay in memory access). In order to solve such a problem, QDR memory is employed as the external memory, thereby absorbing the external latency.

An arrangement illustrated in FIG. 21 include four token supply setting units 3110 and four token counter 3120, thereby enabling four PIDs to be processed at the same time.

[Operation]

The operation of the second embodiment is the same as that of the first embodiment. Accordingly, description will be omitted.

[Time Chart]

FIGS. 22A and 22B are diagrams illustrating an example of the time chart for the second embodiment. FIGS. 22A and 22B illustrate an example of a policing device (or input rate monitoring function unit 324) with a 20 Gbps data capacity, operating at a clock speed (CLK) of 200 MHz. With the policing device illustrated in FIG. 21, the packet input operation is performed once every four clocks, and the token supply operation is performed twice every one clock.

The horizontal direction of the time chart illustrated in FIGS. 22A and 22B represents time. The time slots illustrated in the top view represent the time slots for the internal clock, the FP, the PIDs of the packets, the PIDs of the tokens, the A-side info-cache unit, the A-side cache register unit, the B-side info-cache unit and the B-side cache register unit. The time slots illustrated in the middle view represent the time slots for "Address", "RPS", "WPS", "Write DATA" and "Read DATA" for the token counter 3120. "RPS" and "WPS" correspond to "Read Enable" and "Write Enable" for the internal memory.

In the example illustrated in FIGS. 22A and 22B, a packet is input every four clocks. Furthermore, 16 tokens are processed every eight clocks. This is because the QDR memory is capable of processing two token PIDs for each clock.

The storage operation for the packet information and the token PIDs are the same as that in the example illustrated in FIGS. 20A and 20B.

In the time slots 18 through 21, the operation unit 3080 reads out, from the token counter 3120, the token counter (currently transmittable data capacity) for each of the PIDs "a", "b", "c" and "d". Furthermore, in the time slots 21 and 22, the operation unit 3080 reads out the token counters with the PID of "0" through "15". Four QDR memory units (external storage medium units) are provided, which enables two token counters to be consecutively read out for each clock. This enables a total of 16 token counters to be read out every two clocks.

The operation unit 3080 performs the policing operation based upon the information thus read out etc. In the time slots 26 through 31, the operation unit 3080 writes the operation results to the token counter 3120.

In the time slots 30 and 31, the operation unit 3080 reads out the token counters with the token PIDs of "16" through "31". In this case, the time slots for the readout operation overlaps the time slots for the writing operation described above. However, such an arrangement employing the QDR memory operates without any problem.

The operation unit 3080 performs the policing operation based upon the information thus read out etc. In the time slots 38 and 39, the operation unit 3080 writes the operation results to the token counter 3120.

Accordingly, in the example illustrated in FIGS. 22A and 22B, the token supply processing can be performed twice every eight clocks. Thus, such an arrangement is capable of processing 16 PIDs of tokens every eight clocks.

The second embodiment can be realized by employing QDR memory as the policing devices in the first embodiment.

With the second embodiment, such external memory (external storage medium) is employed, thereby allowing the number of PIDs to be easily increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A rate monitoring apparatus using a token bucket algorithm controlling a packet flow over a network, the rate monitoring apparatus comprising:
    a packet information extraction unit receiving packets including packet information and extracting the packet information from the received packets;
    a first packet information storage unit storing the packet information;
    a second packet information storage unit storing the packet information;
    a token identifying information generating unit generating identification information used to supply a created token;
    a first token identifying information storage unit storing the identification information used to supply the created token, generated by the token identifying information generating unit;
    a second token identifying information storage unit storing the identification information used to supply the created token, generated by the token identifying information generating unit; and
    an operation unit reading out the packet information from one of the first packet information storage unit and the second packet information storage unit and reading out the identification information used to supply the created token from one of the first token identifying information storage unit and the second token identifying information storage unit, wherein
    the packet information extraction unit stores the extracted packet information in one of the first packet information storage unit and the second packet information storage unit,
    the operation unit reads out the packet information from the second packet information storage unit at a timing at which the packet information extraction unit writes the packet information to the first packet information storage unit, and reads out the packet information from the first packet information storage unit at a timing at which the packet information extraction unit writes the packet information to the second packet information storage unit,
    the token identifying information generating unit stores the generated identification information used to supply the created token in one of the first token identifying information storage unit and the second token identifying information storage unit, and
    wherein the operation unit reads out the identification information used to supply the created token from the second token identifying information storage unit at a timing at which the token identifying information generating unit writes the identification information used to supply the created token to the first token identifying information storage unit, and reads out the identification information used to supply the created token from the first token identifying information storage unit at a timing at which the token identifying information generating unit writes the identification information used to supply the created token to the second token identifying information storage unit.

2. The rate monitoring apparatus according to claim 1, comprising:
    a token supply setting unit storing token supply information with respect to each identification information included in the packet information; and
    a transmittable data capacity storage part storing a transmittable data capacity with respect to each identification information included in the packet information,
    wherein the operation unit reads out the token supply information from the token supply setting unit with respect to each identification information included in the packet information based on the packet information and the identification information used to supply the created token, and reads out the transmittable data capacity from the transmittable data capacity storage part.

3. The rate monitoring apparatus according to claim 2, wherein the token supply setting unit and the transmittable data capacity storage part include a quad data rate memory.

4. The rate monitoring apparatus according to claim 1, wherein the packet information includes the identification information of a packet and a packet length.

5. The rate monitoring apparatus according to claim 4, wherein the operation unit calculates an updated transmittable data capacity with respect to each identification information included in the packet information based on the packet length, the token supply information and the currently transmittable data capacity.

* * * * *